(12) United States Patent
Miyano et al.

(10) Patent No.: US 11,535,297 B2
(45) Date of Patent: Dec. 27, 2022

(54) DRIVING SUPPORT SYSTEM

(71) Applicant: Toyota Jidosha Kabushiki Kaisha, Toyota (JP)

(72) Inventors: Kumiko Miyano, Susono (JP); Miyuki Kamatani, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/136,305

(22) Filed: Dec. 29, 2020

(65) Prior Publication Data
US 2021/0284237 A1   Sep. 16, 2021

(30) Foreign Application Priority Data

Mar. 12, 2020   (JP) .............................. JP2020-043105

(51) Int. Cl.
*B62D 15/02*   (2006.01)

(52) U.S. Cl.
CPC .............................. *B62D 15/0265* (2013.01)

(58) Field of Classification Search
CPC ............ B60W 10/20; B60W 2710/20; B60W 40/072; B60W 2540/18; B60W 2552/30; B60W 30/045; B60W 30/18145; B60W 30/0953; B60W 30/095; B60W 30/09
See application file for complete search history.

(56) References Cited

U.S. PATENT DOCUMENTS

| | | | |
|---|---|---|---|
| 8,577,552 B1 * | 11/2013 | Smit ..................... | G01S 13/931 701/41 |
| 10,793,147 B2 | 10/2020 | Kaminade et al. | |
| 10,875,531 B2 * | 12/2020 | Ivanovic ............. | G05D 1/0212 |
| 2015/0210279 A1 * | 7/2015 | Agnew ............... | B60W 10/184 701/48 |
| 2017/0232973 A1 * | 8/2017 | Otake .................. | B60W 50/10 701/43 |
| 2018/0009473 A1 * | 1/2018 | Akatsuka ............. | B62D 15/025 |
| 2018/0059674 A1 * | 3/2018 | Kunisa ................. | G05D 1/0246 |
| 2019/0126977 A1 * | 5/2019 | Kim ..................... | B62D 15/029 |
| 2019/0256140 A1 * | 8/2019 | Suzuki .................. | B62D 5/091 |

(Continued)

FOREIGN PATENT DOCUMENTS

| | | | |
|---|---|---|---|
| DE | 102019202776 A1 * | 9/2020 | |
| JP | 2004189177 A  * | 7/2004 | |
| JP | 2004-338638 A | 12/2004 | |

(Continued)

*Primary Examiner* — Redhwan K Mawari
(74) *Attorney, Agent, or Firm* — Dinsmore & Shohl LLP

(57) ABSTRACT

A driving support system that supports driving of a vehicle executes steering support control that steers the vehicle in a first direction away from a risk factor in front of the vehicle. A target steering amount in the steering support control is represented by a function of a relative relationship parameter including a lateral distance between the vehicle and the risk factor. A straight road is a road having a curvature less than a first curvature. A curved road is a road having a curvature equal to or greater than the first curvature. When a road ahead from the vehicle to the risk factor includes the curved road, the driving support system reduces the target steering amount for the same relative relationship parameter or advances a start timing of the steering support control as compared to when the road ahead is the straight road.

5 Claims, 20 Drawing Sheets

(56) References Cited

U.S. PATENT DOCUMENTS

2020/0039511 A1 * 2/2020 Ohmura .......... B60W 30/18145

FOREIGN PATENT DOCUMENTS

| | | | | | |
|---|---|---|---|---|---|
| JP | 2004345401 | A | * | 12/2004 | |
| JP | 2006-306139 | A | | 11/2006 | |
| JP | 4142194 | B2 | * | 8/2008 | |
| JP | 2012016964 | A | * | 1/2012 | |
| JP | 2016037266 | A | * | 3/2016 | |
| JP | 2017-095100 | A | | 6/2017 | |
| JP | 2018012369 | A | * | 1/2018 | ............ B60T 8/1755 |
| KR | 101519287 | B1 | * | 5/2015 | ................ B60T 7/12 |
| SE | 1650513 | A1 | * | 10/2017 | ........... B62D 15/025 |

* cited by examiner

DRIVING SUPPORT SYSTEM

CROSS-REFERENCE TO RELATED APPLICATION

This application claims priority to Japanese Patent Application No. 2020-043105 filed on Mar. 12, 2020, incorporated herein by reference in its entirety.

BACKGROUND

1. Technical Field

The present disclosure relates to a driving support control that supports driving of a vehicle. In particular, the present disclosure relates to a risk avoidance control for avoiding risk factors in front of the vehicle.

2. Description of Related Art

Japanese Unexamined Patent Application Publication No. 2017-095100 discloses a collision avoidance system for vehicles. The collision avoidance system uses sensors to detect a pedestrian near the vehicle. The collision avoidance system then steers the vehicle to avoid a collision with the pedestrian while the vehicle overtakes the pedestrian.

SUMMARY

A risk avoidance control for avoiding the risk factors such as a pedestrian in front of the vehicle will be discussed. The risk avoidance control may include steering support control that steers the vehicle away from the risk factors. The situation in which such steering support control is operated is not limited to the situation in which the vehicle travels on a straight road. The steering support control can be operated even when the vehicle is traveling on a curved road.

However, if the steering support control is executed on a curved road with the same control strength as in the case of a straight road, an occupant of the vehicle (typically, the driver) may feel uneasy. For example, when the steering support control is further executed while the vehicle is turning on a curved road, the lateral acceleration of the vehicle is further increased, and the occupant may feel uneasy about the vehicle behavior. As another example, when the steering support control is executed in a direction opposite to a curved direction while the vehicle is turning on a curved road, the turning radius of the vehicle may increase, and the occupant may feel uneasy about the possibility that the vehicle may run off the curved road.

One object of the present disclosure is to provide a technique capable of reducing uneasiness of an occupant about a steering support control on a curved road regarding a risk avoidance control for avoiding risk factors in front of a vehicle.

A first aspect relates to a driving support system that supports driving of a vehicle. The driving support system includes: a storage device that stores driving environment information indicating a driving environment of the vehicle; and a processor that executes steering support control for steering the vehicle in a first direction away from a risk factor in front of the vehicle based on the driving environment information. A target steering amount in the steering support control is represented by a function of a relative relationship parameter including a lateral distance between the vehicle and the risk factor. A straight road is a road having a curvature less than a first curvature. A curved road is a road having a curvature equal to or greater than the first curvature. When a road ahead from the vehicle to the risk factor includes the curved road, the processor reduces the target steering amount for the same relative relationship parameter or advances a start timing of the steering support control as compared to when the road ahead is the straight road.

A second aspect has the following feature in addition to the first aspect. When the road ahead includes the curved road and the first direction is opposite to a curved direction of the curved road, the processor reduces the target steering amount for the same relative relationship parameter or advances the start timing of the steering support control as compared to the case where the first direction coincides with the curved direction.

A third aspect further has the following feature in addition to the first or second aspect. The processor reduces the target steering amount for the same relative relationship parameter or advances the start timing of the steering support control as the curvature of the curved road increases.

A fourth aspect further has the following features in addition to any of the first to third aspects. The processor sets a risk region around the risk factor and executes the steering support control such that the vehicle avoids the risk region. The processor reduces the target steering amount for the same relative relationship parameter by reducing the risk region.

A fifth aspect further has the following feature in addition to any of the first to fourth aspects. The risk factor includes at least one of a pedestrian, a bicycle, a two-wheeled vehicle, and a parked vehicle in front of the vehicle.

According to the present disclosure, the steering support control is executed in consideration of the road shape of the road ahead from the vehicle to the risk factor. Specifically, when the road ahead includes a curved road, the target steering amount of the steering support control is reduced or the start timing of the steering support control is advanced as compared with the case where the road ahead is a straight road. As a result, when the road ahead includes a curved road, the lateral movement amount of the vehicle due to the steering support control is reduced than when the road ahead is a straight road. Alternatively, the increase in the lateral acceleration of the vehicle due to the steering support control is suppressed. Therefore, the uneasiness of the occupant regarding the steering support control on the curved road is reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described with reference to the accompanying drawings.

1. Overview 1-1. Driving Support Control

Figure 1:
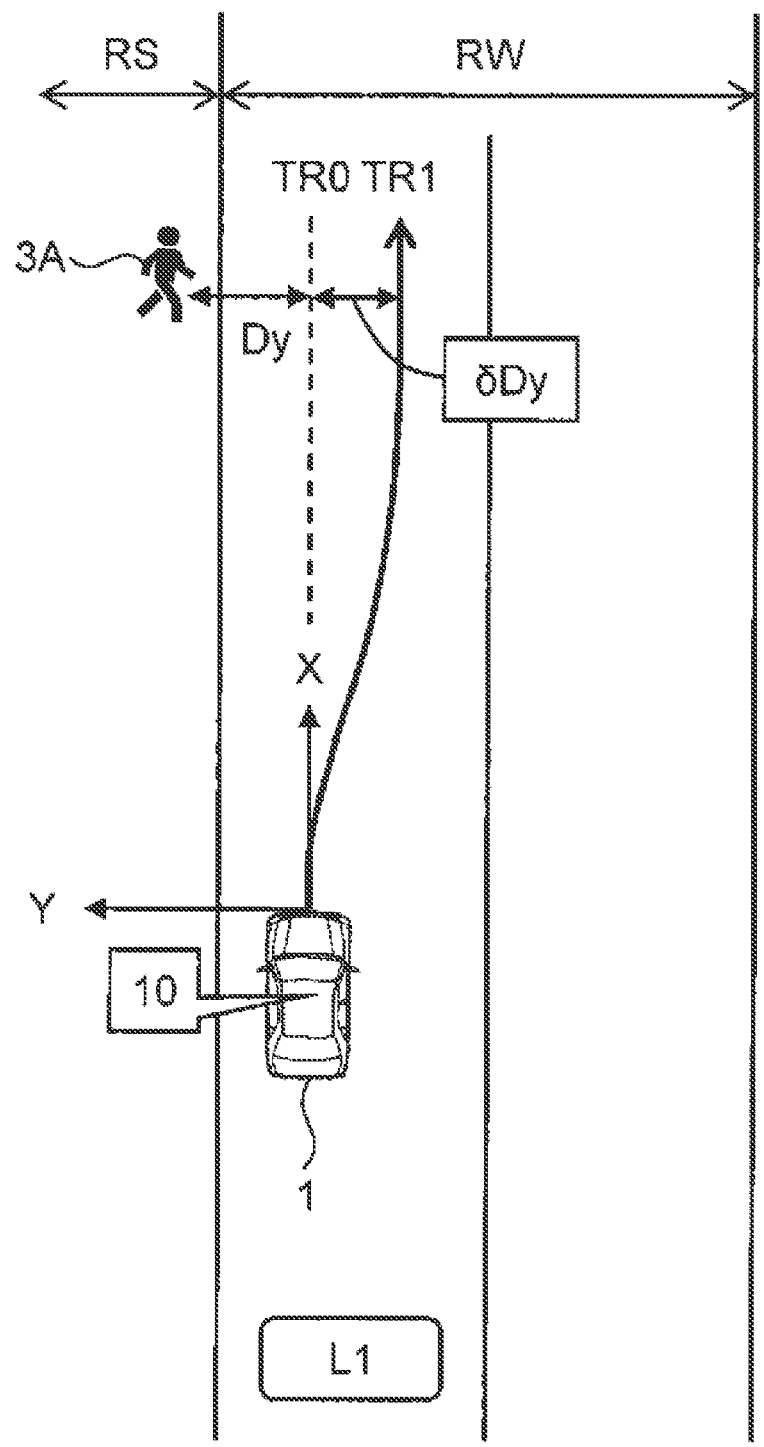
FIG. 1 is a conceptual diagram illustrating an overview of a driving support system according to an embodiment of the present disclosure.

FIG. 1 is a conceptual diagram illustrating an overview of a driving support system 10 according to the present embodiment. The driving support system 10 executes a "driving support control" that supports driving of a vehicle 1. The driving support control may be included in an autonomous driving control. Typically, the driving support system 10 is mounted on the vehicle 1. Alternatively, at least a part of the driving support system 10 may be disposed in an external device outside the vehicle 1 to execute the driving support control remotely. That is, the driving support system 10 may be dispersedly disposed in the vehicle 1 and the external device.

The driving support control includes a "risk avoidance control" that avoids a risk factor 3 in front of the vehicle 1. Specifically, the driving support system 10 automatically steers or/and decelerates the vehicle 1 to avoid the risk factor 3 in front of the vehicle 1.

For example, in FIG. 1, the vehicle 1 is traveling in a first lane L1 in a roadway RW. A road shoulder RS is adjacent to the first lane L1. A pedestrian 3A in the road shoulder RS in front of the vehicle 1 may enter the roadway RW (first lane L1). Thus, the pedestrian 3A in the road shoulder RS in front of the vehicle 1 is the risk factor 3. The risk avoidance control includes a "steering support control" that automatically steers the vehicle 1 so as to avoid the pedestrian 3A in advance. Specifically, the driving support system 10 automatically steers the vehicle 1 in a direction away from the pedestrian 3A (first direction) to avoid the pedestrian 3A in advance.

The pedestrian 3A may be replaced by a bicycle or a two-wheeled vehicle. Further, pedestrians, bicycles, two-wheeled vehicles, etc. in the roadway RW, besides the road shoulder RS, are included in the risk factor 3.

Figure 2:
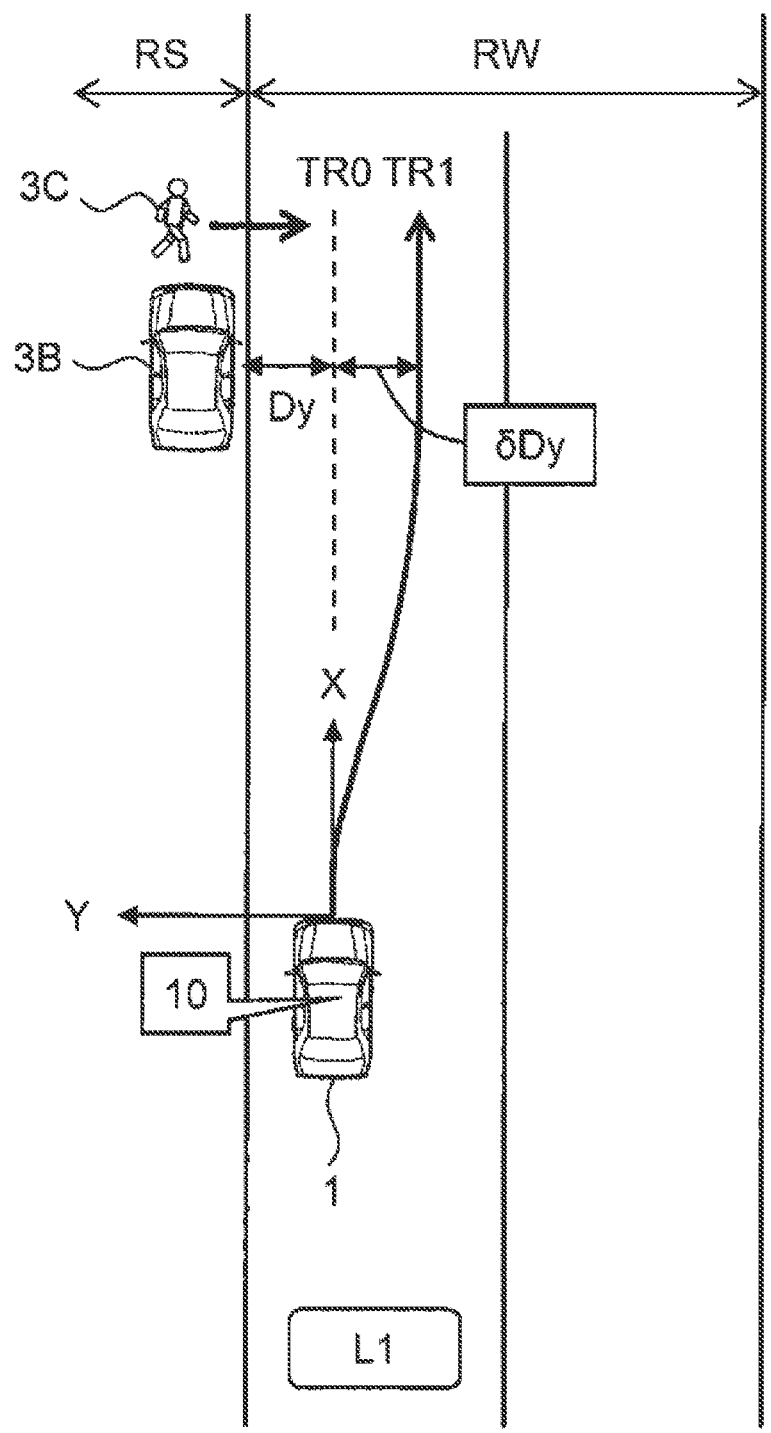
FIG. 2 is a conceptual diagram illustrating an example of a risk avoidance control according to the embodiment of the present disclosure.

FIG. 2 is a conceptual diagram illustrating another example of the risk avoidance control. The risk factor 3 is not limited to an "explicit risk" such as the pedestrian 3A described above. The risk factor 3 may also include a "potential risk". For example, in FIG. 2, there is a parked vehicle 3B in the road shoulder RS in front of the vehicle 1. The region beyond the parked vehicle 3B is a blind spot, from which the pedestrian 3C may pop out. Thus, the parked vehicle 3B in front of the vehicle 1 is a risk factor 3 (potential risk). The risk avoidance control includes the steering support control that automatically steers the vehicle 1 so as to avoid the parked vehicle 3B in advance. Specifically, the driving support system 10 steers the vehicle 1 in a direction away from the parked vehicle 3B (first direction).

As described above, examples of the risk factor 3 include pedestrians, bicycles, two-wheeled vehicles, parked vehicles, that are in front of the vehicle 1.

Here, a vehicle coordinate system (X, Y) is defined. The vehicle coordinate system (X, Y) is a relative coordinate system fixed to the vehicle 1, and changes with the movement of the vehicle 1. The X direction is a forward direction (traveling direction) of the vehicle 1. The Y direction is a lateral direction of the vehicle 1. The X direction and the Y direction are orthogonal to each other.

In FIGS. 1 and 2, a trajectory TR0 represents a trajectory of the vehicle 1 when the steering support control is not executed. When the steering support control is not executed, it is assumed that the vehicle 1 travels in parallel with the first lane L1. Thus, the trajectory TR0 extends parallel to the first lane L1 from the current position of the vehicle 1. In the following description, a lateral distance Dy is the shortest distance between the trajectory TR0 and the risk factor 3. In other words, the lateral distance Dy is the distance in the Y direction between the vehicle 1 (trajectory TR0) and the risk factor 3 when the vehicle 1 passes by the risk factor 3.

In FIGS. 1 and 2, a first trajectory TR1 represents a trajectory of the vehicle 1 when the steering support control is executed. When the steering support control is executed, the vehicle 1 moves in the first direction away from the risk factor 3. A lateral movement amount δDy is the movement amount of the vehicle 1 in the first direction due to the steering support control. In other words, the lateral movement amount δDy is the movement amount of the vehicle 1 in the first direction as seen from the trajectory TR0.

1-2. Steering Support Control on Curved Road

Next, the steering support control on a curved road will be discussed. Here, a road having a curvature C equal to or greater than a first curvature Cth is defined as a "curved road". On the other hand, a road having a curvature C less than the first curvature Cth is defined as a "straight road". According to the present embodiment, the steering support control method differs between a curved road and a straight road. Hereinafter, various examples of the steering support control on a curved road will be described.

1-2-1. First Example (Comparative Example)

Figure 3:
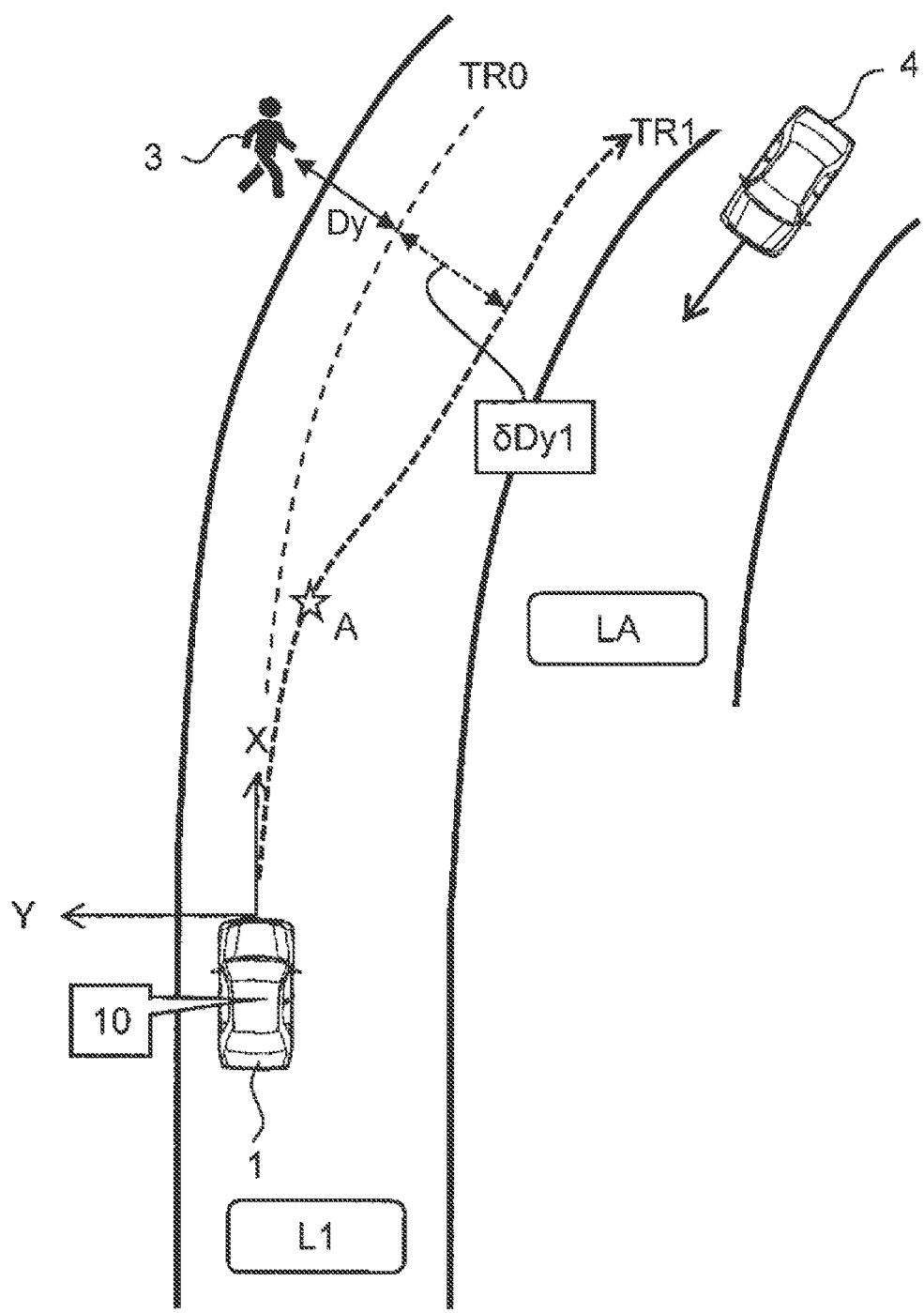
FIG. 3 is a conceptual diagram illustrating a first example (comparative example) of a steering support control on a curved road according to the embodiment of the present disclosure.

FIG. 3 is a conceptual diagram illustrating a first example (comparative example) of the steering support control on a curved road. In FIG. 3, the curved road is curved to the right. The steering direction of the steering support control, that is, the first direction is also the right direction. That is, the first direction coincides with the curved direction of the curved road. It can be said that the steering support control steers the vehicle 1 toward the inside of the curved road.

In the comparative example, the steering support control is executed on a curved road with the same control strength as in the case of a straight road. The first trajectory TR1 is the trajectory of the vehicle 1 in the case of the comparative example. The first lateral movement amount δDy1 is the lateral movement amount δDy in the case of the comparative example.

However, if the steering support control is executed on a curved road with the same control strength as in the case of a straight road, the occupant of the vehicle 1 (typically, the driver) may feel uneasy. For example, when the steering support control is further executed while the vehicle 1 is turning on a curved road, the lateral acceleration of the vehicle 1 is further increased, and the occupant may feel uneasy about the vehicle behavior. In the comparative example shown in FIG. 3, the lateral acceleration increases particularly near the point A. When the first lateral movement amount δDy1 is large, the occupant may feel uneasy about the vehicle 1 approaching an oncoming vehicle 4 in an adjacent lane LA.

1-2-2. Second Example

Figure 4:
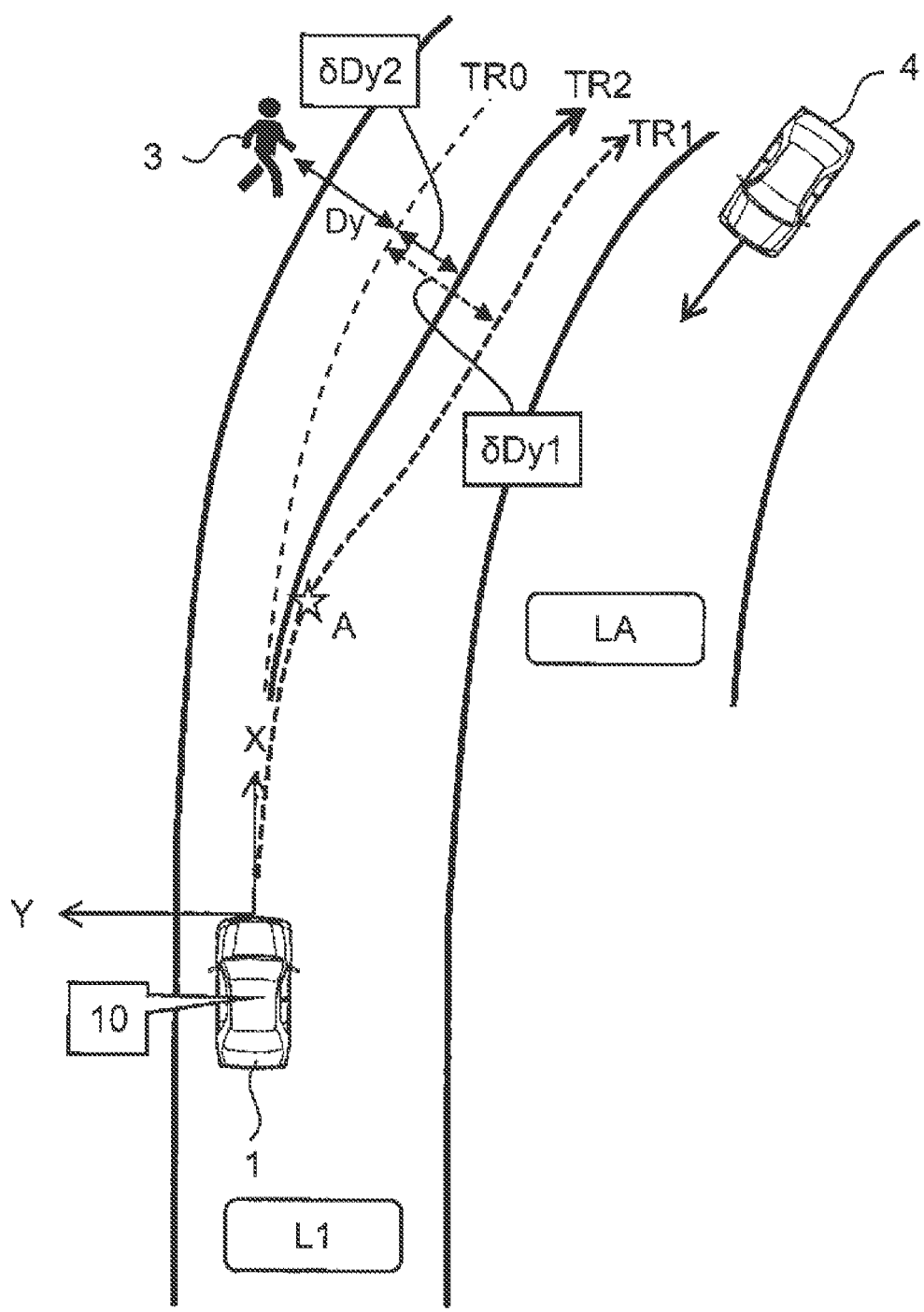
FIG. 4 is a conceptual diagram illustrating a second example of the steering support control on a curved road according to the embodiment of the present disclosure.

FIG. 4 is a conceptual diagram illustrating a second example of the steering support control on a curved road. Similar to the situation in the above comparative example, the steering direction of the steering support control, that is, the first direction coincides with the curved direction of the curved road.

According to the second example, the control strength of the steering support control is weakened as compared with the case of the comparative example. Weakening the control strength of the steering support control means reducing (mitigating) the influence of the steering support control on the trajectory of the vehicle 1. In other words, weakening the control strength of the steering support control means reducing the lateral movement amount δDy in the first direction away from the risk factor 3.

A second trajectory TR2 is the trajectory of the vehicle 1 in the case of the second example. A second lateral movement amount δDy2 is the lateral movement amount δDy in the case of the second example. As shown in FIG. 4, the second trajectory TR2 is located between the trajectory TR0 and the first trajectory TR1. That is, the second lateral movement amount δDy2 is smaller than the first lateral movement amount δDy1 in the case of the comparative example. As a result, the increase in the lateral acceleration of the vehicle 1 due to the steering support control is suppressed as compared with the case of the comparative example. It can also be said that the driving support system 10 executes the steering support control so that the lateral movement amount δDy and the lateral acceleration of the vehicle 1 due to the steering support control become smaller than in the case of the comparative example.

As described above, according to the second example, when the road ahead from the vehicle 1 to the risk factor 3 includes a curved road, the driving support system 10 weakens the control strength of the steering support control as compared with the case where the road ahead is a straight road. Thus, the lateral movement amount δDy of the vehicle 1 due to the steering support control becomes relatively small. Further, the increase in the lateral acceleration of the vehicle 1 due to the steering support control is suppressed. Therefore, the uneasiness of the occupant regarding the steering support control on the curved road is reduced.

1-2-3. Third Example

Figure 5:
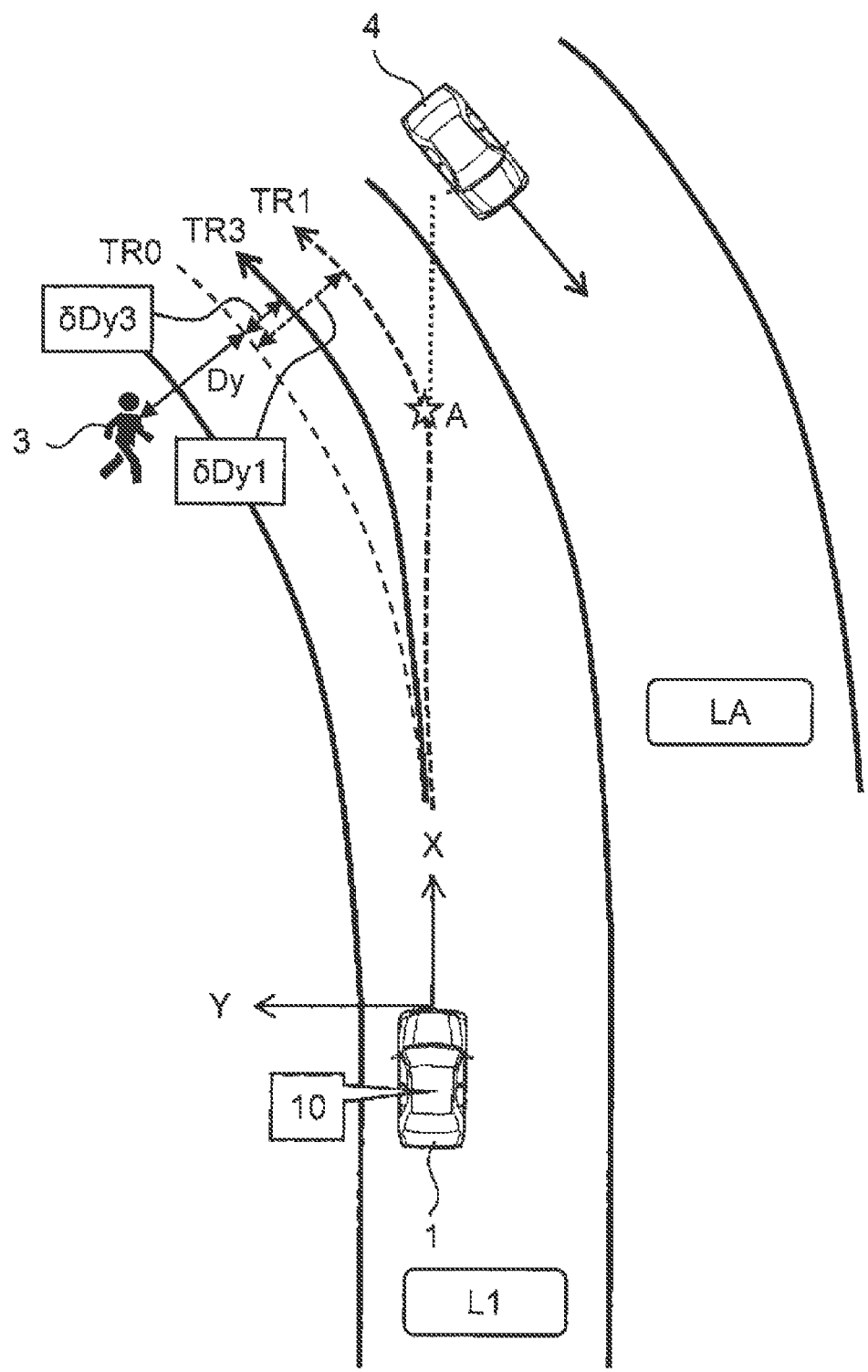
FIG. 5 is a conceptual diagram illustrating a third example of the steering support control on a curved road according to the embodiment of the present disclosure.

FIG. 5 is a conceptual diagram illustrating a third example of the steering support control on a curved road. Descriptions that overlap with the second example described above will be omitted as appropriate. In the third example, the curved road is curved to the left. On the other hand, steering direction of the steering support control, that is, the first direction is the right direction. That is, the first direction is opposite to the curved direction of the curved road. It can be said that the steering support control steers the vehicle 1 toward the outside of the curved road.

In the case of the comparative example, the occupant (typically, the driver) of the vehicle 1 may feel uneasy. For example, a large lateral acceleration may be applied to the vehicle 1 near the point A in FIG. 4, which may cause the occupant to feel uneasy about the vehicle behavior. Further, since the first direction is opposite to the curved direction, the turning radius of the vehicle 1 is increased, and the occupant may feel uneasy about the possibility that the vehicle 1 may run off of the curve road. Further, when the first lateral movement amount δDy1 is large, the occupant may feel uneasy about the vehicle 1 approaching the oncoming vehicle 4 in the adjacent lane LA.

In view of this, according to the third example, the control strength of the steering support control is weakened as compared with the case of the comparative example. A third trajectory TR3 is the trajectory of the vehicle 1 in the case of the third example. A third lateral movement amount δDy3 is the lateral movement amount δDy in the case of the third example. The third trajectory TR3 is located between the trajectory TR0 and the first trajectory TR1. That is, the third lateral movement amount δDy3 is smaller than the first lateral movement amount δDy1 in the case of the comparative example. As a result, the increase in the lateral acceleration of the vehicle 1 due to the steering support control is suppressed as compared with the case of the comparative example. As a result, as in the case of the second example described above, the uneasiness of the occupant regarding the steering support control on the curved road is reduced.

In the case of the third example, the steering direction of the steering support control, that is, the first direction is opposite to the curved direction of the curved road. Thus, the feeling that the vehicle 1 may run off of the curved road is stronger than in the case of the second example described above (see FIG. 4). Therefore, in the case of the third example, the driving support system 10 may further weaken the control strength of the steering support control as compared with the case of the second example described above. In this case, the third trajectory TR3 is located between the trajectory TR0 and the second trajectory TR2. The third lateral movement amount δDy3 is further smaller than the second lateral movement amount δDy2 in the case of the second example. As a result, the uneasiness that the vehicle 1 may run off of the curved road is sufficiently reduced.

1-2-4. Fourth Example

Figure 6:
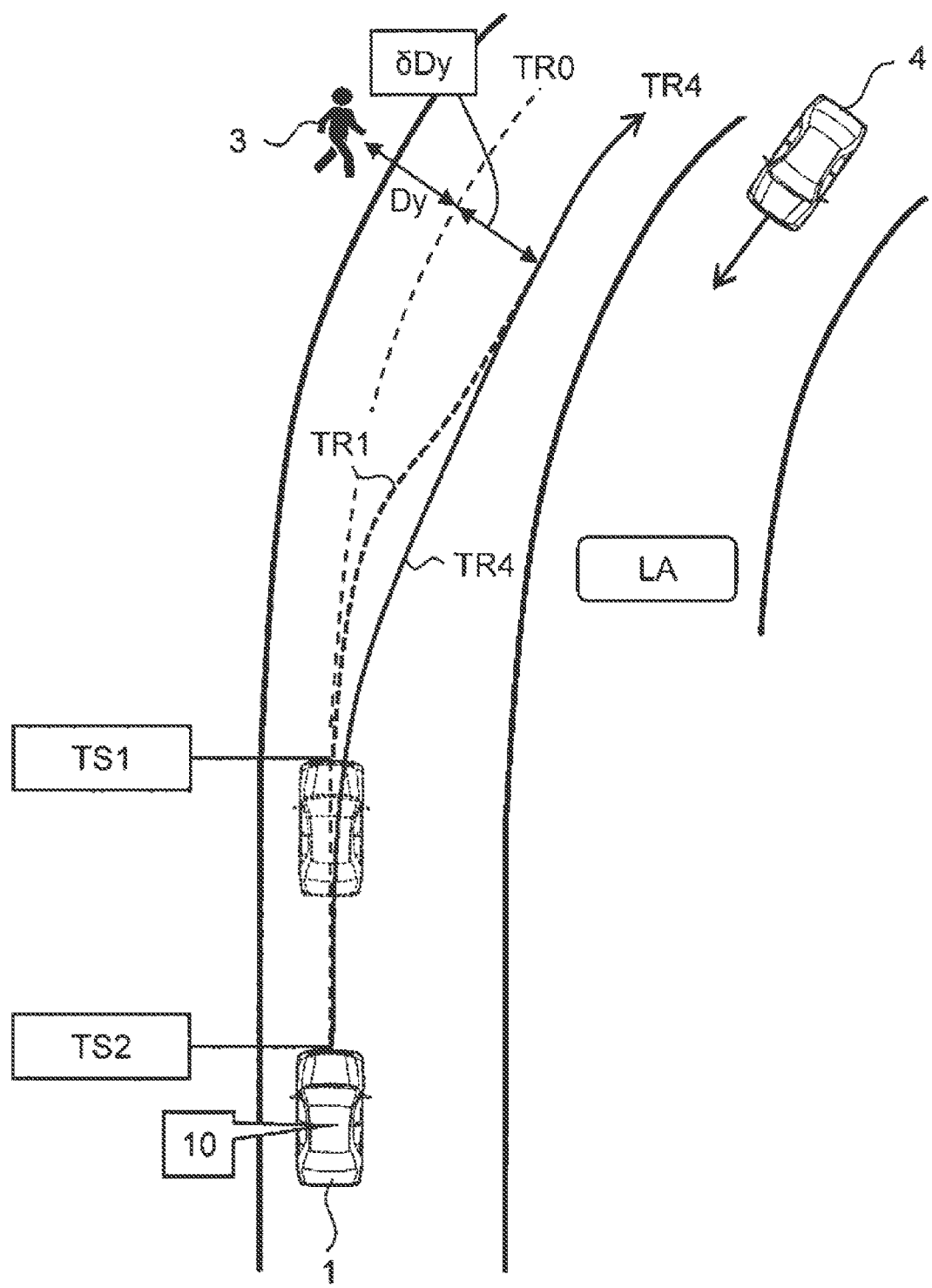
FIG. 6 is a conceptual diagram illustrating a fourth example of the steering support control on a curved road according to the embodiment of the present disclosure.

FIG. 6 is a conceptual diagram illustrating a fourth example of the steering support control on a curved road. In the fourth example, as in the situation in the second example described above, the first direction coincides with the curved direction of the curved road. Descriptions that overlap with the second example will be omitted as appropriate.

First, as a comparative example, a case where the steering support control is started on a curved road at the same timing as in the case of a straight road will be discussed. In the case of the comparative example, the steering support control starts at a first start timing TS1. The first trajectory TR1 is the trajectory of the vehicle 1 in the case of the comparative example.

According to the fourth example, the start timing of the steering support control is earlier as compared with the case of the comparative example. As shown in FIG. 6, the driving support system 10 starts the steering support control at a second start timing TS2 that is earlier than the first start timing TS1. A fourth trajectory TR4 is the trajectory of the vehicle 1 in the case of the fourth example.

Since the start timing of the steering support control is earlier, the curvature of the fourth trajectory TR4 is smaller than the curvature of the first trajectory TR1 even when the lateral movement amount δDy (control strength) is the same. Thus, the increase in the lateral acceleration of the vehicle 1 due to the steering support control is suppressed as compared with the case of the comparative example. It can also be said that the driving support system 10 executes the steering support control so that the lateral acceleration of the vehicle 1 due to the steering support control becomes smaller than in the case of the comparative example. Since the increase in the lateral acceleration is suppressed, the uneasiness of the occupant regarding the steering support control on the curved road is reduced.

The second example and the fourth example can also be combined. That is, the driving support system 10 may weaken the control strength of the steering support control and advance the start timing of the steering support control as compared with the case of the comparative example. In this way, the uneasiness of the occupant regarding the steering support control on the curved road is further reduced.

1-2-5. Fifth Example

Figure 7:
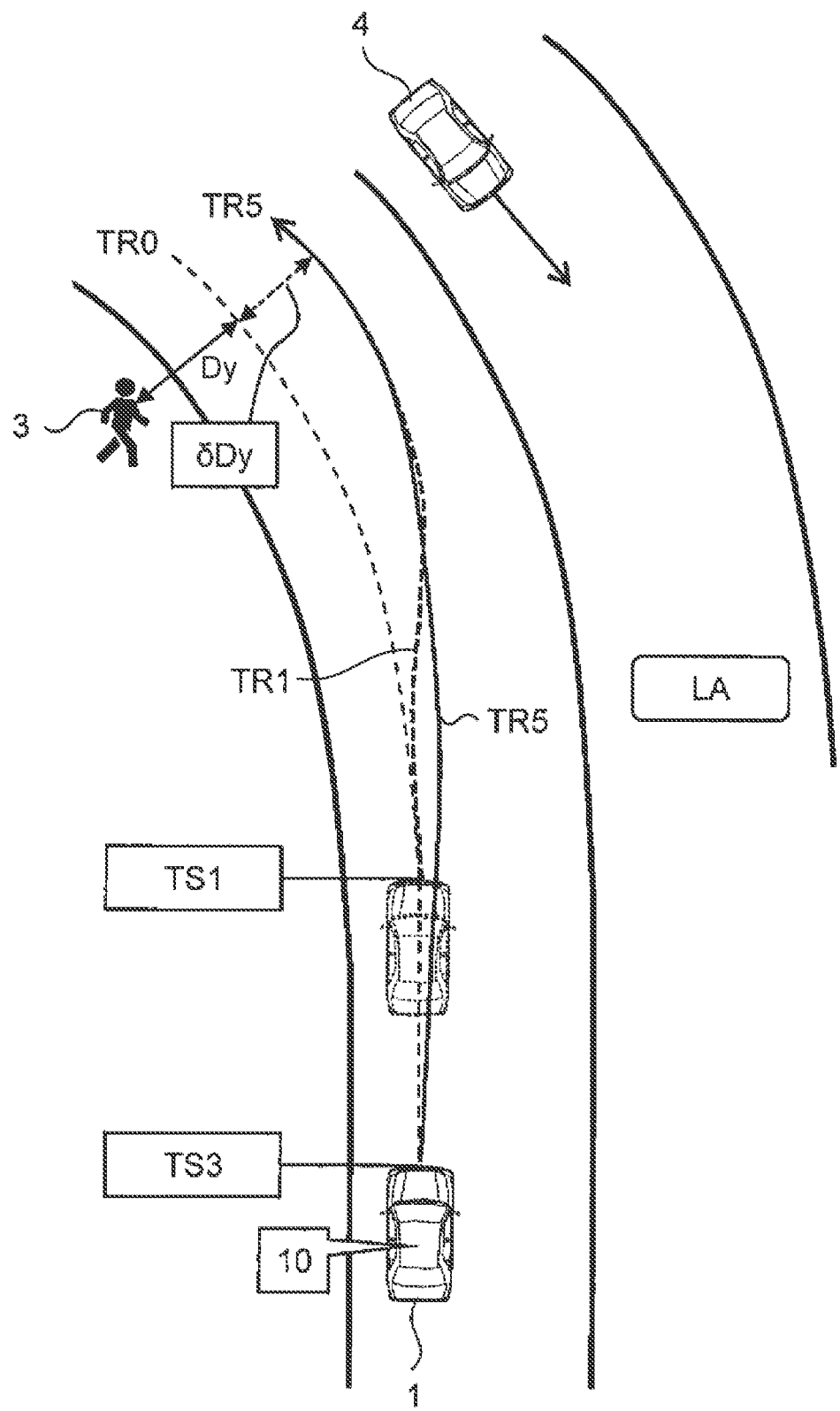
FIG. 7 is a conceptual diagram illustrating a fifth example of the steering support control on a curved road according to the embodiment of the present disclosure.

FIG. 7 is a conceptual diagram illustrating a fifth example of the steering support control on a curved road. In the fifth example, as in the situation in the third example described above, the first direction is opposite to the curved direction of the curved road. Descriptions that overlap with the third and fourth examples will be omitted as appropriate.

According to the fifth example, the start timing of the steering support control is earlier as compared with the case of the comparative example. As shown in FIG. 7, the driving support system 10 starts the steering support control at a third start timing TS3 that is earlier than the first start timing TS1. A fifth trajectory TR5 is the trajectory of the vehicle 1 in the case of the fifth example.

Since the start timing of the steering support control is earlier, the curvature of the fifth trajectory TR5 is smaller than the curvature of the first trajectory TR1 even when the lateral movement amount δDy (control strength) is the same. Thus, the increase in the lateral acceleration of the vehicle 1 due to the steering support control is suppressed as compared with the case of the comparative example. As a result, as in the case of the fourth example described above, the uneasiness of the occupant regarding the steering support control on the curved road is reduced.

In the case of the fifth example, the steering direction of the steering support control, that is, the first direction is opposite to the curved direction of the curved road. Thus, the feeling that the vehicle 1 may run off of the curved road is stronger than in the case of the fourth example described above (see FIG. 6). Therefore, in the case of the fifth example, the driving support system 10 may further advance the start timing of the steering support control as compared with the case of the fourth example described above. In this case, the third start timing TS3 is further earlier than the second start timing TS2 in the case of the fourth example. As a result, the uneasiness such that the vehicle 1 may run off of the curved road is sufficiently reduced.

The third example and the fifth example can also be combined. That is, the driving support system 10 may weaken the control strength of the steering support control and advance the start timing of the steering support control as compared with the case of the comparative example. In this way, the uneasiness of the occupant regarding the steering support control on the curved road is further reduced.

1-3. Effect

As described above, the driving support system 10 according to the present embodiment executes the steering support control for steering the vehicle 1 in the first direction away from the risk factor 3 in front of the vehicle 1. In particular, the driving support system 10 executes the steering support control in consideration of the road shape of the road ahead from the vehicle 1 to the risk factor 3. Specifically, when the road ahead includes a curved road, the driving support system 10 weakens the control strength of the steering support control or advances the start timing of the steering support control as compared with the case where the road ahead is a straight road. As a result, the lateral movement amount δDy of the vehicle 1 due to the steering support control becomes relatively small. Alternatively, the increase in the lateral acceleration of the vehicle 1 due to the steering support control is suppressed. Therefore, the uneasiness of the occupant regarding the steering support control on the curved road is reduced.

When the first direction is opposite to the curved direction of the curved road, the driving support system 10 may weaken the control strength of the steering support control or may advance the start timing of the steering support control as compared with the case where the first direction coincides with the curved direction. As a result, the uneasiness such that the vehicle 1 may run off of the curved road is sufficiently reduced.

Hereinafter, the driving support system 10 according to the present embodiment will be described in more detail.

2. Driving Support System

2-1. Configuration Example

Figure 8:
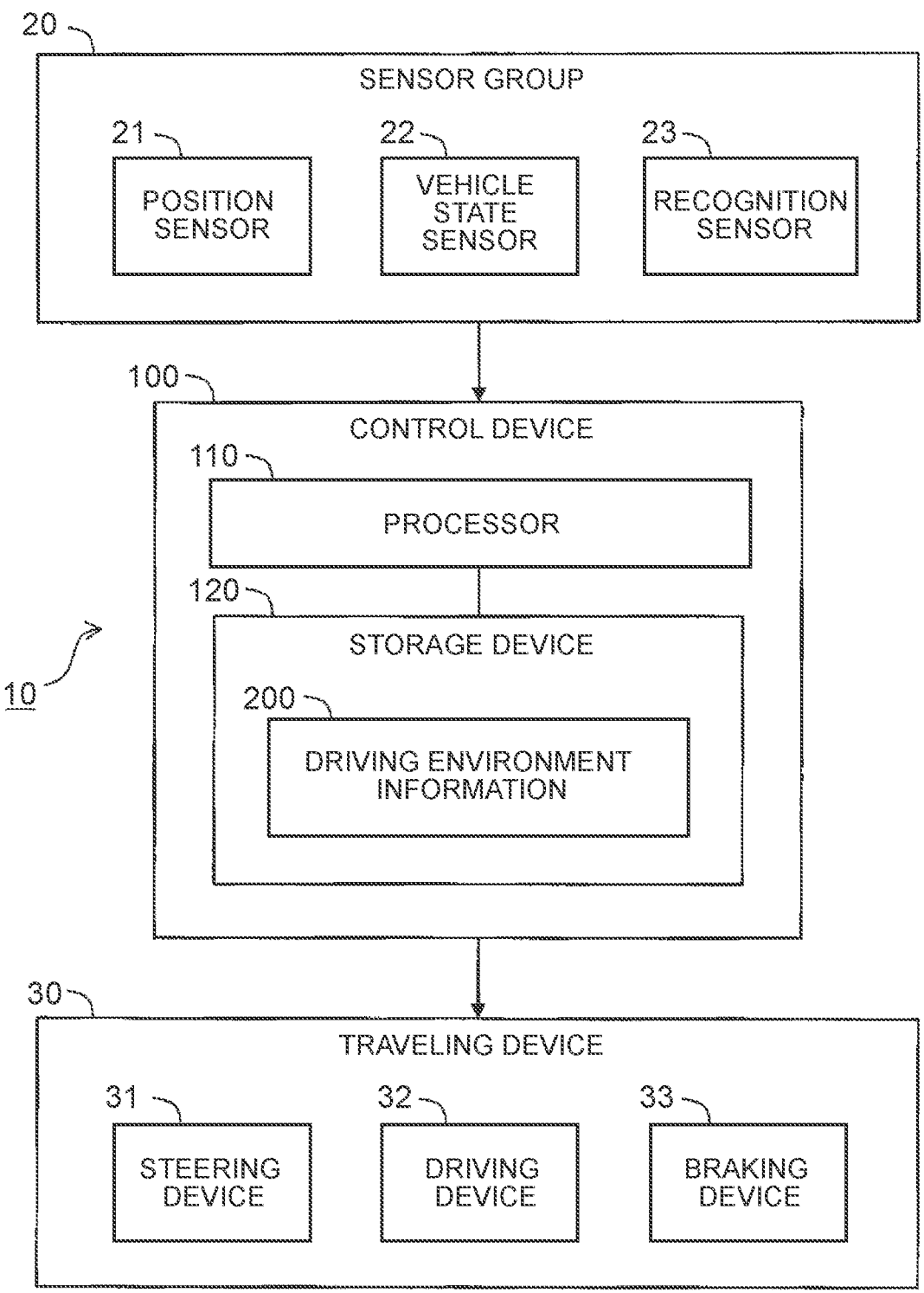
FIG. 8 is a block diagram showing a configuration example of a vehicle and the driving support system according to the embodiment of the present disclosure.

FIG. 8 is a block diagram schematically showing a configuration example of the vehicle 1 and the driving support system 10 according to the present embodiment. In particular, FIG. 8 shows a configuration example related to the risk avoidance control. The vehicle 1 includes a sensor group 20 and a traveling device 30.

The sensor group 20 includes a position sensor 21, a vehicle state sensor 22, and a recognition sensor 23. The position sensor 21 detects the position and orientation of the vehicle 1. Examples of the position sensor 21 include a Global Positioning System (GPS) sensor. The vehicle state sensor 22 detects the state of the vehicle 1. Examples of the vehicle state sensor 22 include a vehicle speed sensor, a yaw rate sensor, a lateral acceleration sensor, a steering angle sensor, and the like. The recognition sensor 23 recognizes (detects) the situation around the vehicle 1. Examples of the recognition sensor 23 include a camera, a radar, a laser imaging detection and ranging (LIDAR), and the like.

The traveling device 30 includes a steering device 31, a driving device 32, and a braking device 33. The steering device 31 steers the wheels of the vehicle 1. For example, the steering device 31 includes a power steering (electric power steering (EPS)) device. The driving device 32 is a driving power source that generates a driving force. Examples of the driving device 32 include an engine, an electric motor, an in-wheel motor, and the like. The braking device 33 generates a braking force.

The driving support system 10 includes at least a control device 100. The driving support system 10 may include the sensor group 20. The driving support system 10 may include the traveling device 30.

The control device 100 controls the vehicle 1. Typically, the control device 100 is a microcomputer mounted on the vehicle 1. The control device 100 is also referred to as an electronic control unit (ECU). Alternatively, the control device 100 may be an information processing device outside the vehicle 1. In that case, the control device 100 communicates with the vehicle 1 and controls the vehicle 1 remotely.

The control device 100 includes a processor 110 and a storage device 120. The processor 110 executes various processes. Various types of information are stored in the storage device 120. Examples of the storage device 120 include a volatile memory, a non-volatile memory, and the like. When the processor 110 executes a control program that is a computer program, various processes executed by the processor 110 (control device 100) are realized. The control program is stored in the storage device 120 or recorded on a computer-readable storage medium.

2-2. Information Acquisition Process

The processor 110 (control device 100) executes an "information acquisition process" for acquiring driving environment information 200 indicating the driving environment of the vehicle 1. The driving environment information 200 is acquired based on the detection results of the sensor group 20 mounted on the vehicle 1. The acquired driving environment information 200 is stored in the storage device 120.

Figure 9:
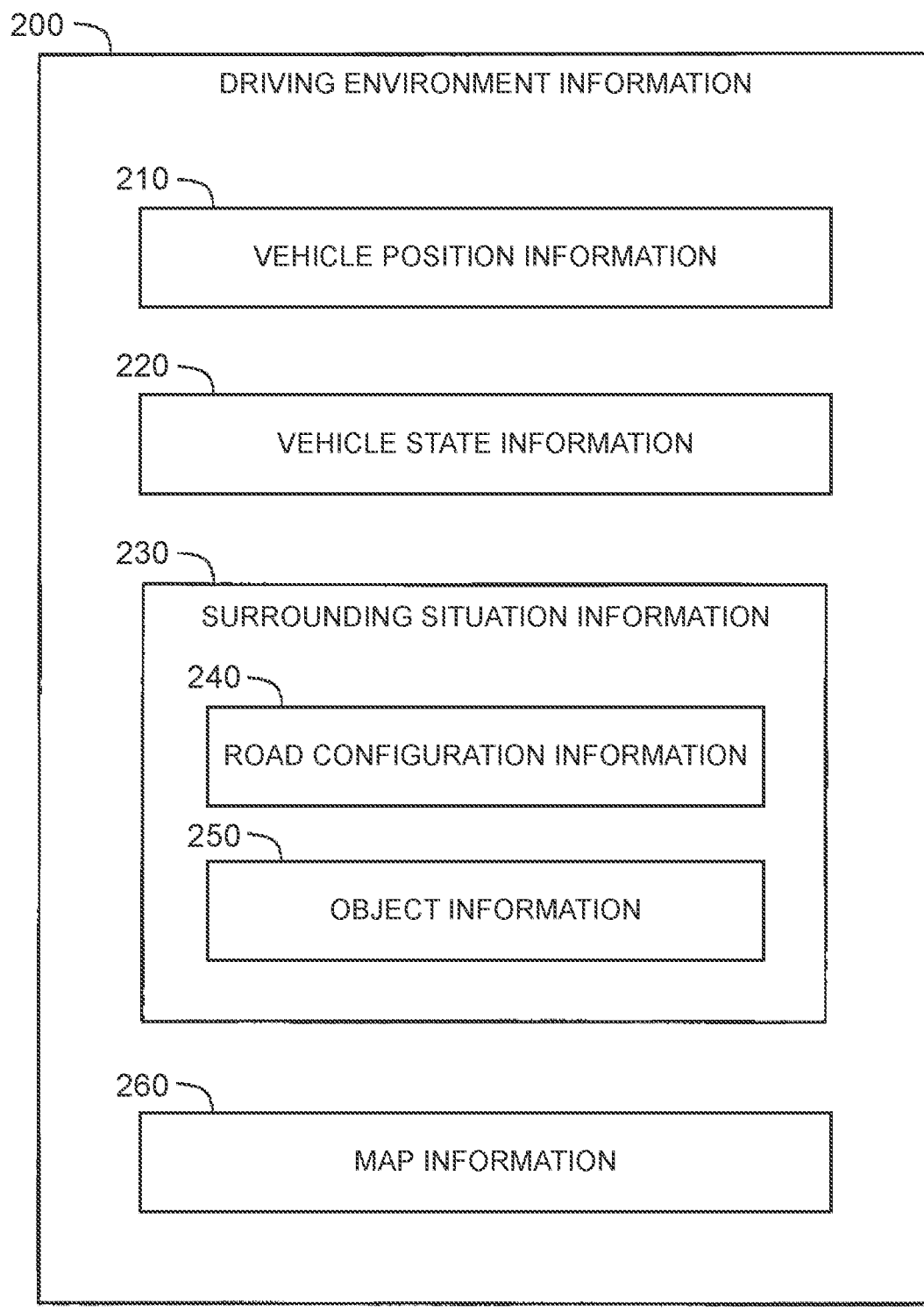
FIG. 9 is a block diagram showing an example of driving environment information according to the embodiment of the present disclosure.

FIG. 9 is a block diagram showing an example of the driving environment information 200. The driving environment information 200 includes vehicle position information 210, vehicle state information 220, surrounding situation information 230, map information 260, and the like.

The vehicle position information 210 is information indicating the position and orientation of the vehicle 1. The processor 110 acquires the vehicle position information 210 from the detection result of the position sensor 21.

The vehicle state information 220 is information indicating the state of the vehicle 1. Examples of the state of the vehicle 1 include a vehicle speed, a yaw rate, a lateral acceleration, a steering angle, and the like. The processor 110 acquires the vehicle state information 220 from the detection result of the vehicle state sensor 22.

The surrounding situation information 230 is information indicating the surrounding situation of the vehicle 1. The surrounding situation information 230 includes the information obtained by the recognition sensor 23. For example, the surrounding situation information 230 includes image information indicating the surrounding situation of the vehicle 1 captured by the camera. As another example, the surrounding situation information 230 includes measurement information measured by the radar or the LIDAR. Further, the surrounding situation information 230 includes road configuration information 240 and object information 250.

The road configuration information 240 is information regarding the road configuration around the vehicle 1. The road configuration around the vehicle 1 includes lane markings (white lines) and road edge objects. The road edge objects are three-dimensional obstacles that indicate the edge of the road. Examples of the road edge objects include curbs, guardrails, walls, median strips, and the like. The road configuration information 240 indicates at least the positions of the lane markings and the road edge objects (positions relative to the vehicle 1).

For example, by analyzing the image information obtained by the camera, the lane marking can be identified and the relative position of the lane marking can be calculated. Examples of the image analysis method include a semantic segmentation and an edge detection. Similarly, by analyzing the image information, the road edge object can be identified and the relative position of the road edge object can be calculated. Alternatively, the relative position of the road edge object can be acquired from radar measurement information.

The object information 250 is information regarding the object around the vehicle 1. Examples of the object include pedestrians, bicycles, two-wheeled vehicles, other vehicles (preceding vehicles, parked vehicles, oncoming vehicles, etc.), and the like. The object information 250 indicates the relative position and the relative speed of the object with respect to the vehicle 1. For example, by analyzing the image information obtained by the camera, the object can be identified and the relative position of the object can be calculated. It is also possible to identify the object and acquire the relative position and the relative speed of the object based on the radar measurement information. The object information 250 may include the moving direction and the moving speed of the object. The moving direction and the moving speed of the object can be calculated by tracking the position of the object.

The map information 260 indicates a lane arrangement, a road shape, and the like. The control device 100 acquires the map information 260 of the required area from a map database. The map database may be stored in a predetermined storage device mounted on the vehicle 1, or may be stored in a management server outside the vehicle 1. In the latter case, the processor 110 communicates with the management server to acquire the necessary map information 260.

2-3. Vehicle Travel Control

The processor 110 (control device 100) executes a "vehicle travel control" that controls the traveling of the vehicle 1. The vehicle travel control includes a steering control for controlling the steering of the vehicle 1, an acceleration control for controlling the acceleration of the vehicle 1, and a deceleration control for controlling the deceleration of the vehicle 1. The processor 110 executes the vehicle travel control by controlling the traveling device 30. Specifically, the processor 110 executes the steering control by controlling the steering device 31. Further, the processor 110 executes the acceleration control by controlling the driving device 32. Further, the control device 100 executes the deceleration control by controlling the braking device 33.

2-4. Risk Avoidance Control

The processor 110 (control device 100) executes a driving support control that supports the driving of the vehicle 1. The driving support control includes a risk avoidance control that avoids a risk factor 3 in front of the vehicle 1. The risk avoidance control is a vehicle travel control for avoiding the risk factor 3 in front of the vehicle 1, and includes at least one of the steering control and the deceleration control. The processor 110 executes the risk avoidance control based on the above-mentioned driving environment information 200.

Figure 10:
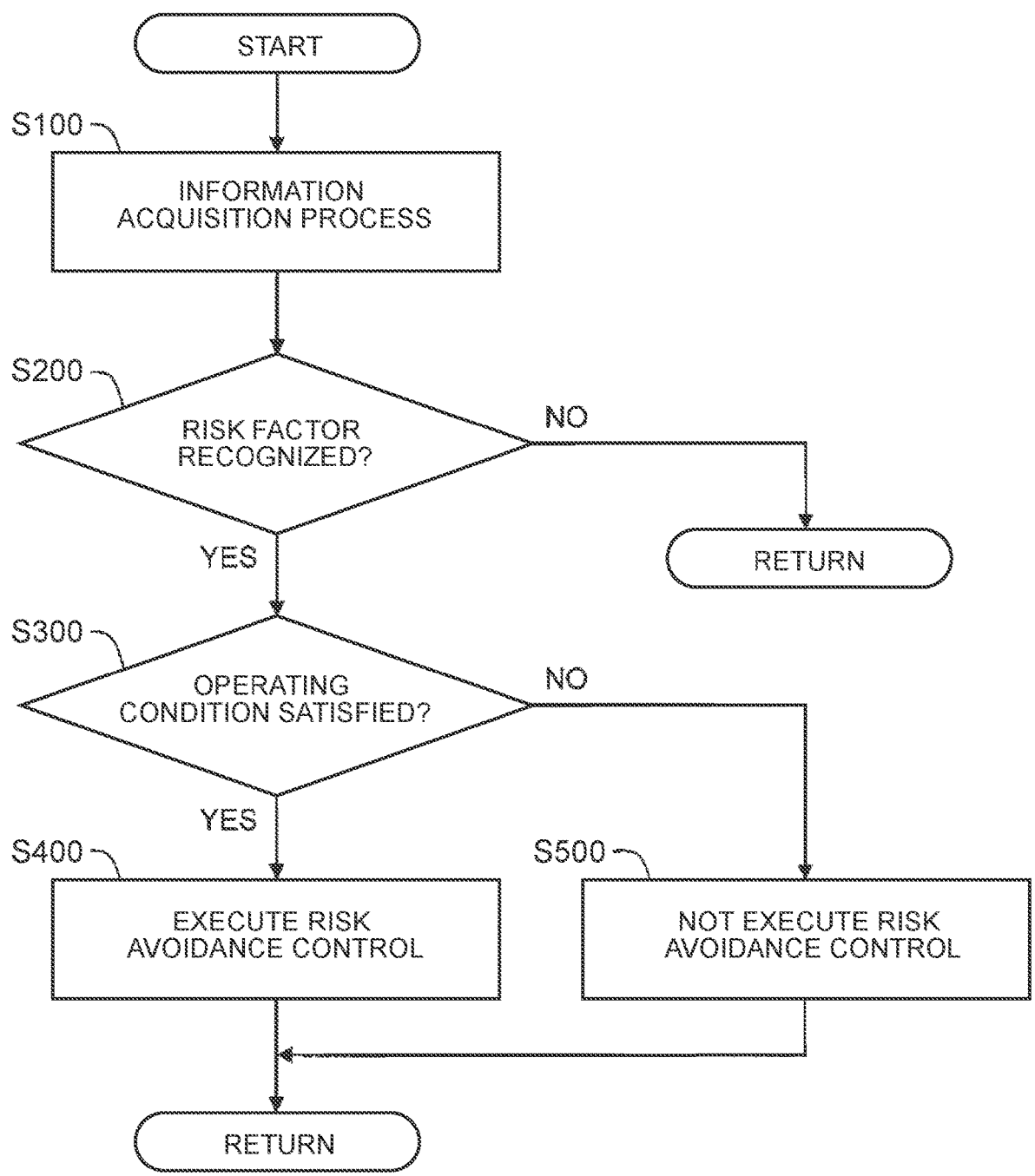
FIG. 10 is a flowchart showing a process related to the risk avoidance control executed by the driving support system according to the embodiment of the present disclosure.

FIG. 10 is a flowchart showing a process related to the risk avoidance control according to the embodiment of the present disclosure. The process flow shown in FIG. 10 is repeatedly executed at regular cycles.

2-4-1. Step S100

In step S100, the processor 110 executes the above-mentioned information acquisition process. That is, the processor 110 acquires the driving environment information 200 based on the detection result of the sensor group 20. The driving environment information 200 is stored in the storage device 120.

2-4-2. Step S200

In step S200, the processor 110 determines whether there is the risk factor 3 in front of the vehicle 1. In other words, the processor 110 determines whether the risk factor 3 is recognized in the region in front of the vehicle 1. The risk factor 3 includes at least one of pedestrians, bicycles, two-wheeled vehicles, and parked vehicles in front of the vehicle 1.

The processor 110 determines whether there is the risk factor 3 in front of the vehicle 1 based on the surrounding situation information 230 (particularly, the road configuration information 240 and the object information 250). Whether there is the risk factor 3 in the roadway RW or whether there is the risk factor 3 in the road shoulder RS can be determined by comparing the position of the risk factor 3 with the position of the lane marking. Alternatively, whether there is the risk factor 3 in the roadway RW or whether there is the risk factor 3 in the road shoulder RS can be determined by comparing the position of the risk factor 3 with the lane arrangement shown in the map information 260.

When the risk factor 3 in front of the vehicle 1 is recognized (step S200; Yes), the process proceeds to step S300. In other cases (step S200; No), the process returns to step S100.

2-4-3. Step S300

In step S300, the processor 110 determines whether the operating condition of the risk avoidance control is satisfied.

For example, the operating condition of the risk avoidance control includes that "a margin time T up to the risk factor 3 is less than an operating threshold Tth". The margin time T is the time required for the vehicle 1 to travel from the current position to the position closest to the risk factor 3. The trajectory TR0 shown in FIGS. 1 to 7 represents a trajectory of the vehicle 1 when the steering support control is not executed. It can be said that the margin time T is the time until the vehicle 1 comes closest to the risk factor when the vehicle 1 travels along the trajectory TR0 at the current vehicle speed. Typically, the timing at which the vehicle 1 comes closest to the risk factor 3 is the timing at which the vehicle 1 passes by the risk factor 3.

The processor 110 can estimate the trajectory TR0 based on the driving environment information 200. For example, the road configuration information 240 indicates the relative positions of the lane markings (white lines) and the road edge objects. Based on the road configuration information 240, the processor 110 can recognize the roadway RW or the first lane L1, and can estimate the trajectory TR0 parallel to the roadway RW or the first lane L1. As another example, the processor 110 can obtain the road shape in front of the vehicle 1 from the map information 260, and can estimate the trajectory TR0 based on the road shape and the vehicle position information 210.

The current vehicle speed of the vehicle 1 is obtained from the vehicle state information 220. The relative position of the risk factor 3 with respect to the vehicle 1 is obtained from the object information 250. The processor 110 can calculate the margin time T up to the risk factor 3 based on the trajectory TR0, the current vehicle speed of the vehicle 1, and the relative position of the risk factor 3. Then, the processor 110 determines whether the operating condition of the risk avoidance control is satisfied by comparing the margin time T with the operating threshold Tth.

The operating condition of the risk avoidance control may further include that "the lateral distance Dy is smaller than a lateral distance threshold". As shown in FIGS. 1 to 7, the lateral distance Dy is the shortest distance between the trajectory TR0 and the risk factor 3. The lateral distance threshold (safety margin) may increase as the vehicle speed increases and may decrease as the vehicle speed decreases.

The operating condition of the risk avoidance control may further include that the vehicle speed of the vehicle 1 is equal to or higher than a certain speed.

When the operating condition of the risk avoidance control is satisfied (step S300; Yes), the process proceeds to step S400. On the other hand, when the operating condition of the risk avoidance control is not satisfied (step S300; No), the process proceeds to step S500.

2-4-4. Step S400

In step S400, the processor 110 executes the risk avoidance control, that is, activates the risk avoidance control. The risk avoidance control is a vehicle travel control for avoiding the risk factor 3, and includes at least one of the steering control and the deceleration control. In particular, the steering control for avoiding the risk factor 3 is the "steering support control" according to the present embodiment. In the steering support control, the processor 110 steers the vehicle 1 in the first direction away from the risk factor 3 based on the driving environment information 200.

Figure 11:
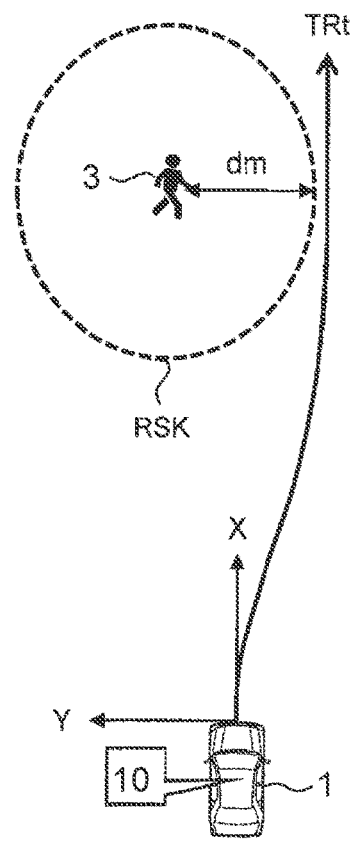
FIG. 11 is a conceptual diagram illustrating an example of the steering support control according to the embodiment of the present disclosure.

FIG. 11 is a conceptual diagram illustrating an example of the steering support control. The processor 110 sets a risk region RSK around the recognized risk factor 3. The risk region RSK is a region where it is desired that the vehicle 1 does not pass. A margin distance dm is a parameter representing the size of the risk region RSK. The margin distance dm may be a constant value or may be variable. For example, the margin distance dm may be variably set depending on the vehicle speed of the vehicle 1. In that case, as the vehicle speed increases, the margin distance dm increases. The position of the risk factor 3 is obtained from the object information 250. The vehicle speed is obtained from the vehicle state information 220. Thus, the processor 110 can set the risk region RSK based on the object information 250 and the vehicle state information 220.

Further, the processor 110 generates a target trajectory TRt so that the vehicle 1 avoids the risk region RSK. The target trajectory TRt includes the target position and the target speed of the vehicle 1 in the roadway RW. The current position of the vehicle 1 is obtained from the vehicle position information 210. The vehicle speed is obtained from the vehicle state information 220. The position of the roadway RW is obtained from the road configuration information 240 or the map information 260. Therefore, the processor 110 can generate the target trajectory TRt based on the risk region RSK and the driving environment information 200.

Then, the processor 110 executes the vehicle travel control so that the vehicle 1 follows the target trajectory TRt. In particular, the processor 110 executes the steering support control so that the vehicle 1 follows the target trajectory TRt. Specifically, the processor 110 calculates a target steering amount (target steering angle) $\theta t$ required for the vehicle 1 to follow the target trajectory TRt. The current steering angle of the vehicle 1 is obtained from the vehicle state information 220. The processor 110 controls the steering device 31 to steer the wheels such that the target steering amount $\theta t$ is realized.

The magnitude of the target steering amount $\theta t$ depends on the magnitude of the lateral distance Dy between the vehicle 1 and the risk factor 3 and the risk region RSK (margin distance dm). For example, when the lateral distance Dy is small, the target trajectory TRt bends greatly in the Y direction in order to secure the margin distance dm. As a result, the target steering amount $\theta t$ required to follow the target trajectory TRt also increases. In contrast, when the lateral distance Dy is sufficiently large and the margin distance dm is secured, the target steering amount $\theta t$ becomes small.

The above is generally described as follows. The target steering amount $\theta t$ in the steering support control is represented by a function of a relative relationship parameter Pr. The relative relationship parameter Pr represents the relative relationship between the vehicle 1 and the risk factor 3. This relative relationship parameter Pr includes at least the lateral distance Dy between the vehicle 1 and the risk factor 3. As the lateral distance Dy decreases, the target steering amount $\theta t$ required to avoid the risk factor 3 increases. The relative relationship parameter Pr may further include the relative speed between the vehicle 1 and the risk factor 3. The relative relationship parameter Pr is obtained from the driving environment information 200 (particularly the object information 250). The processor 110 calculates (determines) the target steering amount $\theta t$ depending on the relative relationship parameter Pr. Then, the processor 110 executes the steering support control based on the target steering amount $\theta t$.

2-4-5. Step S500

In step S500, processor 110 does not execute the risk avoidance control. That is, the processor 110 does not activate the risk avoidance control. When the risk avoidance control is already being executed, the processor 110 stops the risk avoidance control.

3. Adjustment of Operating Condition

Figure 12:
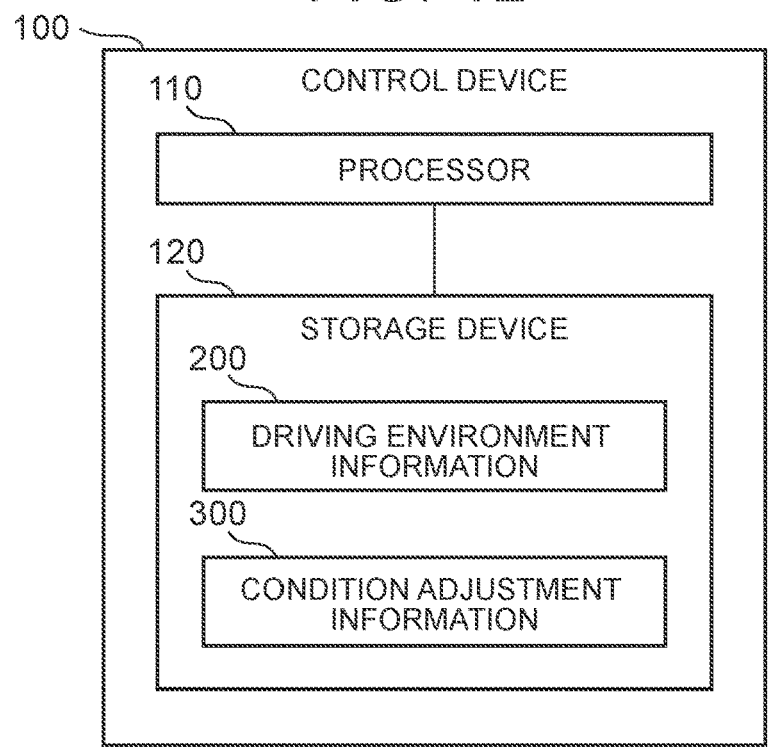
FIG. 12 is a block diagram showing information used in the driving support system according to the embodiment of the present disclosure.

As described above, the operating condition of the risk avoidance control includes that "the margin time T up to the risk factor 3 is less than the operating threshold Tth". By adjusting this operating condition, the start timing of the risk avoidance control (steering support control) can be adjusted. Hereinafter, various examples of methods for adjusting the operating condition of the risk avoidance control will be described. "Condition adjustment information 300" shown in FIG. 12 is used to adjust the operating condition of the risk avoidance control. The condition adjustment information 300 is created in advance and stored in the storage device 120.

3-1. First Example

Figure 13:
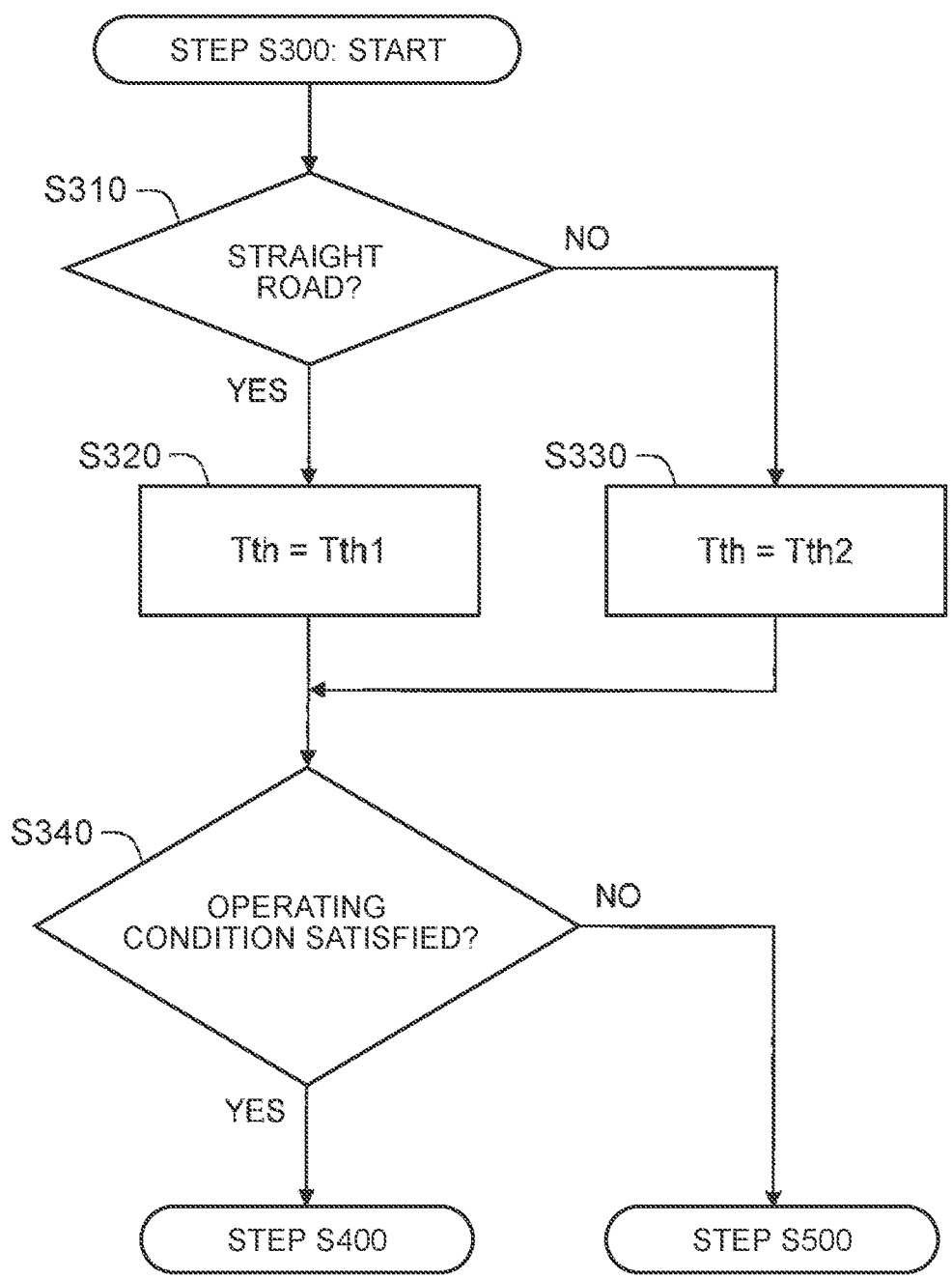
FIG. 13 is a flowchart illustrating a first example of adjusting an operating condition of the risk avoidance control according to the embodiment of the present disclosure.

FIG. 13 is a flowchart illustrating a first example of adjusting the operating condition of the risk avoidance control. FIG. 13 shows the details of step S300 described above.

In step S310, the processor 110 determines whether the road ahead from the vehicle 1 to the risk factor 3 is a straight road. A straight road is a road having a curvature C less than the first curvature Cth. A curved road is a road having a curvature C equal to or greater than the first curvature Cth. For example, the road configuration information 240 indicates the relative positions of the lane markings (white lines) and the road edge objects. Based on the road configuration information 240, the road ahead of the vehicle 1 can be recognized and the curvature C of the road ahead can be calculated. As another example, the processor 110 can obtain the road shape in front of the vehicle 1 from the map information 260, and can calculate the curvature C from the road shape.

When the road ahead is a straight road (step S310; Yes), the process proceeds to step S320. On the other hand, when the road ahead includes a curved road (step S310; No), the process proceeds to step S330.

In step S320, the processor 110 sets the operating threshold Tth to a first operating threshold Tth1. Then, the process proceeds to step S340.

In step S330, the processor 110 sets the operating threshold Tth to a second operating threshold Tth2. The second operating threshold Tth2 is larger than the first operating threshold Tth1 (Tth2>Tth1). Then, the process proceeds to step S340.

In step S340, the processor 110 determines whether the operating condition of the risk avoidance control is satisfied. When the operating threshold Tth is the first operating threshold Tth1, the operating condition is satisfied at the first start timing TS1. On the other hand, when the operating threshold Tth is the second operating threshold Tth2, the operating condition is satisfied at the second start timing TS2 that is earlier than the first start timing TS1. That is, when the road ahead is a curved road, the start timing of the steering support control is earlier than when the road ahead is a straight road (see FIGS. 6 and 7). When the operating condition is satisfied (step S340; Yes) the process proceeds to step S400. On the other hand, when the operating condition is not satisfied (step S340; No) the process proceeds to step S500.

The information of the operating threshold Tth (Tth1, Tth2) is included in the condition adjustment information 300. The processor 110 refers to the condition adjustment information 300 and selects the operating threshold Tth depending on the road shape of the road ahead. This makes it possible to variably set the start timing of the steering support control depending on the road shape of the road ahead.

3-2. Second Example

Figure 14:
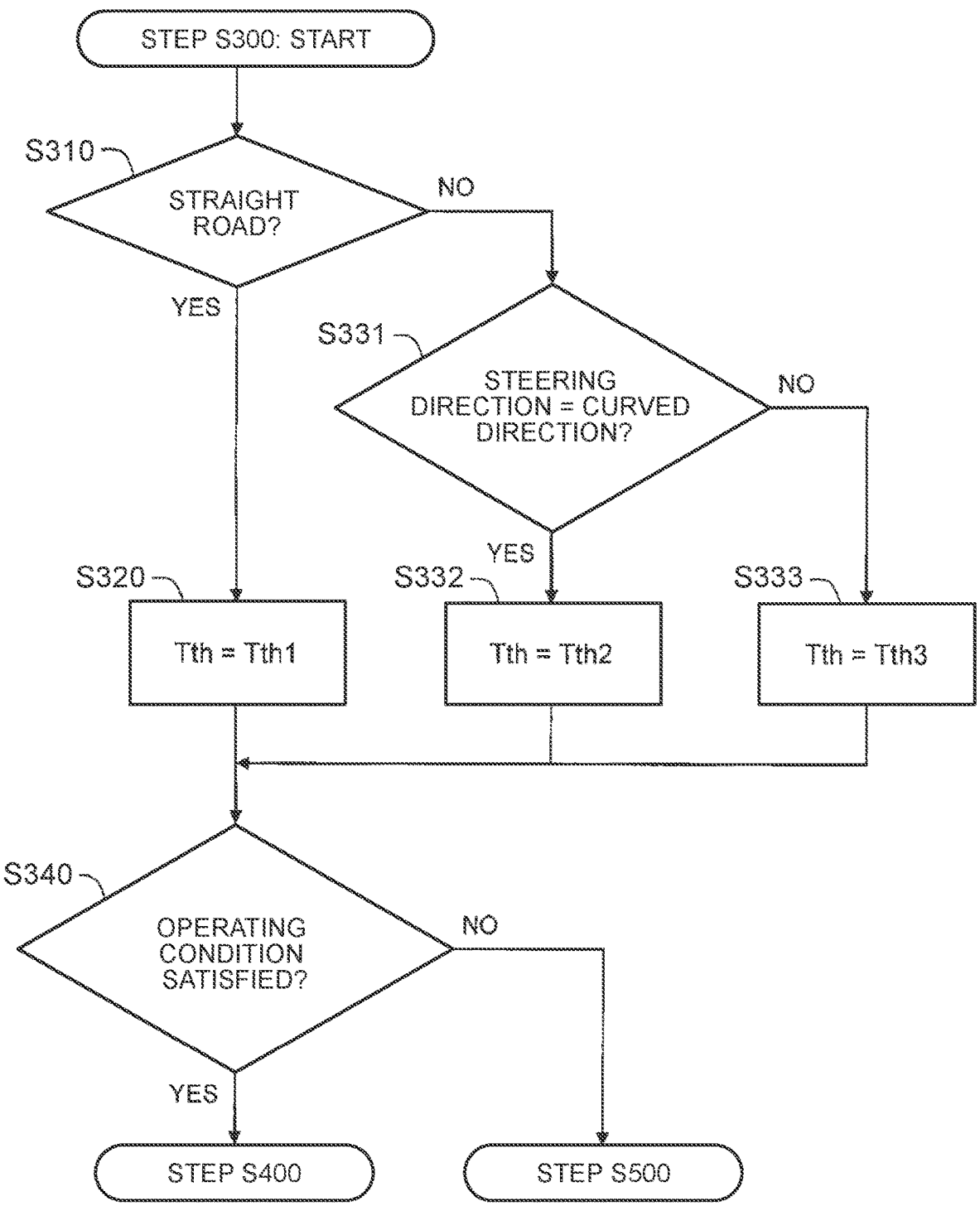
FIG. 14 is a flowchart illustrating a second example of adjusting the operating condition of the risk avoidance control according to the embodiment of the present disclosure.

FIG. 14 is a flowchart illustrating a second example of adjusting the operating condition of the risk avoidance control. Descriptions that overlap with the first example shown in FIG. 13 will be omitted as appropriate. Steps S310 and S320 are the same as in the first example. When the road ahead includes a curved road (step S310; No), the process proceeds to step S331.

In step S331, the processor 110 recognizes the steering direction (first direction) by the steering support control, assuming that the steering support control is activated. For example, when there is the risk factor 3 in the road shoulder RS on the left side of the first lane L1, the steering direction away from the risk factor 3 is the right direction. Generally speaking, the steering direction of the steering support control is determined based on the positional relationship between the vehicle 1, the risk factor 3, and the roadway RW (first lane L1). The position of the vehicle 1 is obtained from the vehicle position information 210. The relative position of the risk factor 3 is obtained from the object information 250. The position of the roadway RW (first lane L1) is obtained from the road configuration information 240 or the map information 260. Thus, the processor 110 can recognize the steering direction of the steering support control based on the driving environment information 200.

Then, the processor 110 determines whether the steering direction of the steering support control coincides with the curved direction of the curved road. The curved direction is obtained from the road configuration information 240 or the map information 260. When the steering direction coincides with the curved direction (step S331; Yes), the process proceeds to step S332. On the other hand, when the steering direction is opposite to the curved direction (step S331; No), the process proceeds to step S333.

In step S332, the processor 110 sets the operating threshold Tth to the second operating threshold Tth2. The second operating threshold Tth2 is larger than the first operating threshold Tth1 (Tth2>Tth1). Then, the process proceeds to step S340.

In step S333, the processor 110 sets the operating threshold Tth to a third operating threshold Tth3. The third operating threshold Tth3 is further larger than the second operating threshold Tth2 (Tth3>Tth2). Then, the process proceeds to step S340.

In step S340, the processor 110 determines whether the operating condition of the risk avoidance control is satisfied. When the operating threshold Tth is the second operating threshold Tth2, the operating condition is satisfied at the second start timing TS2 that is earlier than the first start timing TS1. When the operating threshold Tth is the third operating threshold Tth3, the operating condition is satisfied at the third start timing TS3 that is further earlier than the second start timing TS2. That is, when the steering direction is opposite to the curved direction (see FIG. 7), the start timing of the steering support control is earlier than when the steering direction coincides with the curved direction (see FIG. 6). When the operating condition is satisfied (step S340; Yes) the process proceeds to step S400. On the other hand, when the operating condition is not satisfied (step S340; No) the process proceeds to step S500.

The information of the operating threshold Tth (Tth1, Tth2, Tth3) is included in the condition adjustment information 300. The processor 110 refers to the condition adjustment information 300 and selects the operating threshold Tth depending on the road shape of the road ahead and the steering direction. This makes it possible to variably set the start timing of the steering support control depending on the road shape of the road ahead and the steering direction.

3-3. Third Example

Figure 15:
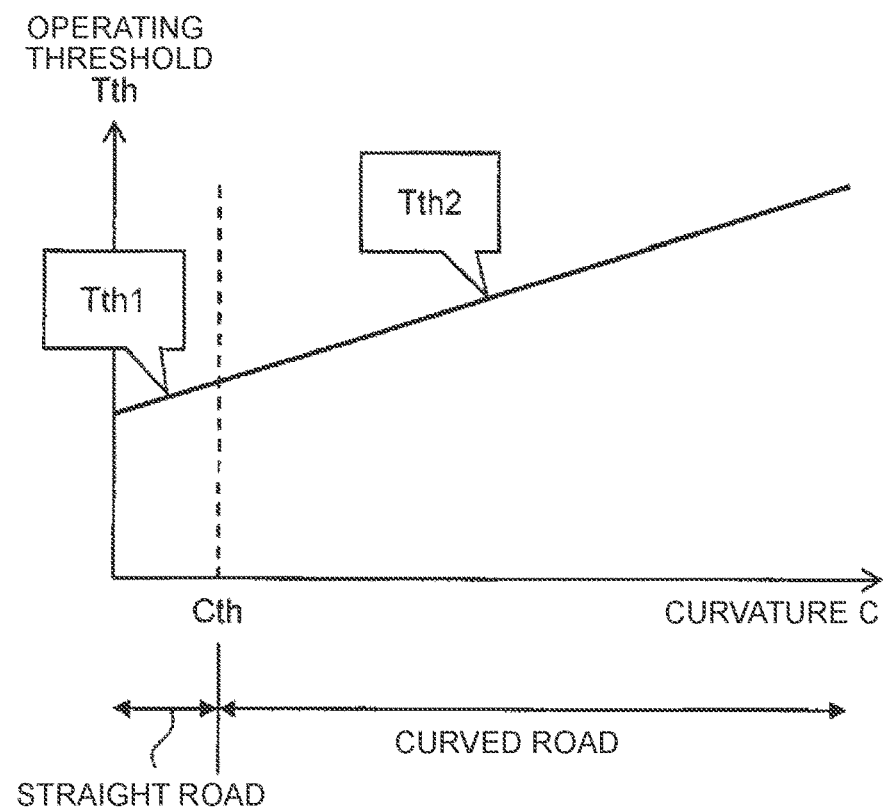
FIG. 15 is a conceptual diagram illustrating a third example of adjusting the operating condition of the risk avoidance control according to the embodiment of the present disclosure.

FIG. 15 is a conceptual diagram illustrating a third example of adjusting the operating condition of the risk avoidance control. In the third example, the operating threshold Tth increases as the curvature C of the road ahead increases. For example, as shown in FIG. 15, the operating threshold Tth increases monotonically as the curvature C increases. As another example, the operating threshold Tth may increase stepwise as the curvature C increases. Thus, as the curvature C increases, the start timing of the risk avoidance control (steering support control) becomes earlier.

The operating threshold Tth is represented by a function of the curvature C of the road ahead. The function may be a mathematical formula or a map generated in advance. The information of the function is included in the condition adjustment information 300. The processor 110 uses the function shown in the condition adjustment information 300 to set the operating threshold Tth depending on the curvature C of the road ahead. Thus, the processor 110 can advance the start timing of the steering support control as the curvature C increases.

The third example can be combined with either one of the first example and the second example described above.

4. Adjustment of Control Strength of Steering Support Control

Figure 16:
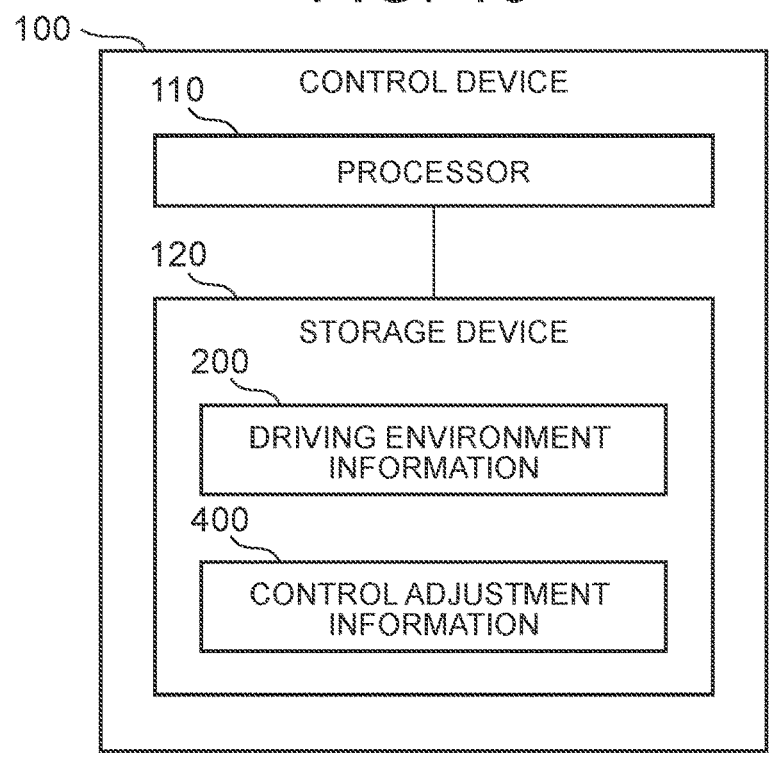
FIG. 16 is a block diagram showing information used in the driving support system according to the embodiment of the present disclosure.

The control strength of the steering support control may be adjusted in place of or in conjunction with the adjustment of the operating condition described above. Hereinafter, various examples of methods for adjusting the control strength of the steering support control will be described. "Control adjustment information 400" shown in FIG. 16 is used to adjust the control strength of the steering support control. The control adjustment information 400 is created in advance and stored in the storage device 120.

4-1. First Example

Figure 17:
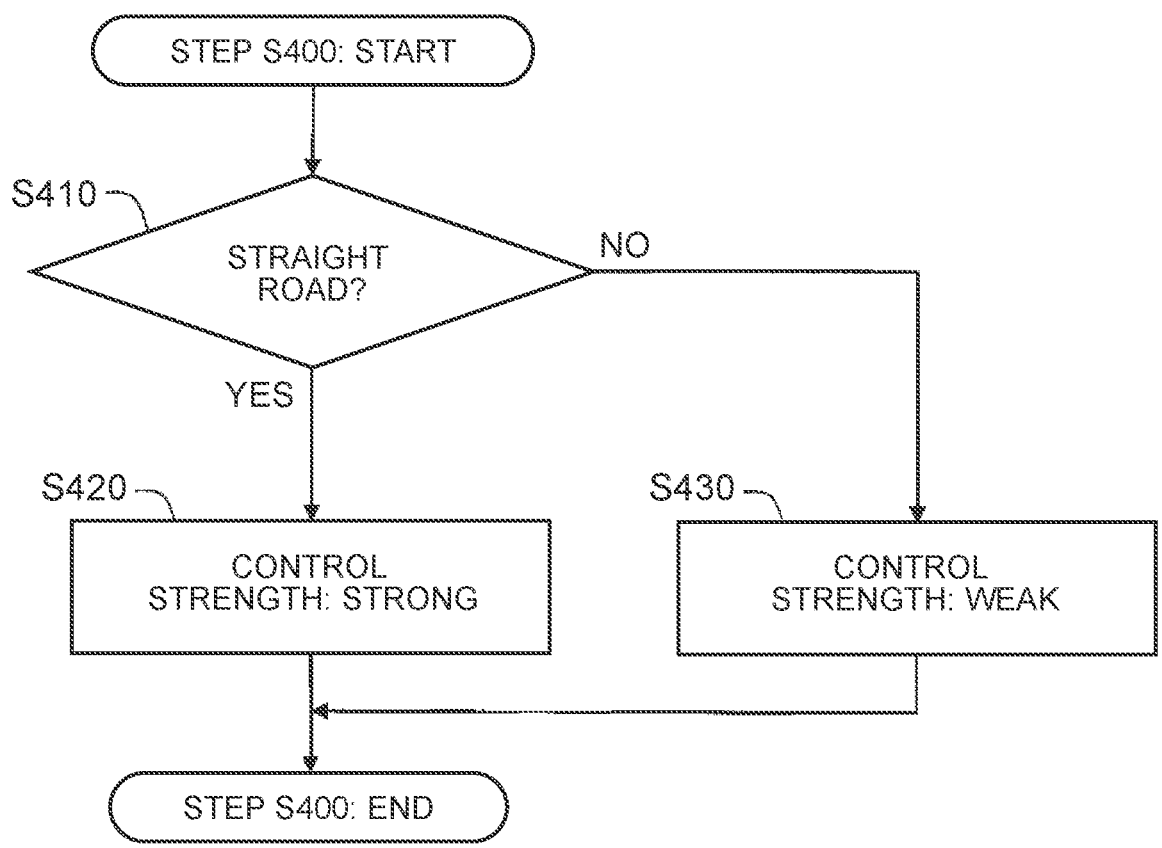
FIG. 17 is a flowchart illustrating a first example of adjusting control strength of the steering support control according to the embodiment of the present disclosure.

FIG. 17 is a flowchart illustrating a first example of adjusting the control strength of the steering support control. FIG. 17 shows the details of step S400 described above.

In step S410, the processor 110 determines whether the road ahead from the vehicle 1 to the risk factor 3 is a straight road. This determination method is the same as step S310 (see FIG. 13) described above. When the road ahead is a straight road (step S410; Yes), the process proceeds to step S420. On the other hand, when the road ahead includes a curved road (step S410; No), the process proceeds to step S430.

In step S420, the processor 110 sets the control strength of the steering support control to a relatively strong level.

In step S430, the processor 110 sets the control strength of the steering support control weaker than that in step S420.

Weakening the control strength of the steering support control means reducing (mitigating) the influence of the steering support control on the trajectory of the vehicle 1. In other words, weakening the control strength of the steering support control means reducing the lateral movement amount $\delta Dy$ in the first direction away from the risk factor 3. Further, in other words, weakening the control strength of the steering support control means reducing the target steering amount $\theta t$ in the steering support control. As the target steering amount $\theta t$ increases, the lateral movement amount $\delta Dy$ in the first direction away from the risk factor 3 increases. In contrast, as the target steering amount $\theta t$ decreases, the lateral movement amount $\delta Dy$ in the first direction away from the risk factor 3 decreases. That is, the control strength of the steering support control can be weakened by reducing the target steering amount $\theta t$.

Generally, as in the following equation (1), the target steering amount $\theta t$ is represented by a function f of the relative relationship parameter Pr. The relative relationship parameter Pr includes at least the lateral distance Dy between the vehicle 1 and the risk factor 3. The relative relationship parameter Pr may further include the relative speed between the vehicle 1 and the risk factor 3.

$$\theta t = f(Pr) \quad \text{Equation (1):}$$

When compared under the condition that the relative relationship parameters Pr are the same, the target steering amount $\theta t$ in step S430 (curved road) is smaller than the target steering amount $\theta t$ in step S420 (straight road). That is, the processor 110 sets the target steering amount $\theta t$ for the same relative relationship parameter Pr smaller in the case of step S430 than in the case of step S420.

For example, in step S420, the processor 110 calculates a first target steering amount $\theta t1$ using a first function f1 (see the following equation (2)). On the other hand, in step S430, the processor 110 calculates a second target steering amount $\theta t2$ using a second function f2. The first function f1 and the second function f2 are set so that the second target steering amount $\theta t2$ is smaller than the first target steering amount $\theta t1$ when compared under the condition that the relative relationship parameters Pr are the same.

$$\theta t1 = f1(Pr)$$
$$\theta t2 = f2(Pr) < f1(Pr) \quad \text{Equation (2):}$$

As an example, the steering support control based on the risk region RSK shown in FIG. 11 above will be discussed. In this case, the function f includes the following processes: [a] setting the risk region RSK (margin distance dm); [b] generating the target trajectory TRt based on the risk region RSK and the relative relationship parameter Pr (lateral distance Dy); and [c] calculating the target steering amount $\theta t$ based on the target trajectory TRt. Of these, by reducing the risk region RSK (margin distance dm) in the process [a], the target steering amount $\theta t$ for the same relative relationship parameter Pr can be reduced. Specifically, the first function f1 is set to calculate the first target steering amount $\theta t1$ using a first margin distance dm1. On the other hand, the second function f2 is set to calculate the second target steering amount $\theta t2$ using a second margin distance dm2 that is smaller than the first margin distance dm1. As a result, the second target steering amount $\theta t2$ becomes smaller than the first target steering amount $\theta t1$ when compared under the condition that the relative relationship parameters Pr are the same.

The information of each function f (f1, f2) is included in the control adjustment information 400. The processor 110 selects the function f depending on the road shape of the road ahead and calculates the target steering amount $\theta t$ using the selected function f. Thereby, the magnitude of the target steering amount $\theta t$, that is, the control strength of the steering support control can be variably set depending on the road shape of the road ahead.

4-2. Second Example

Figure 18:
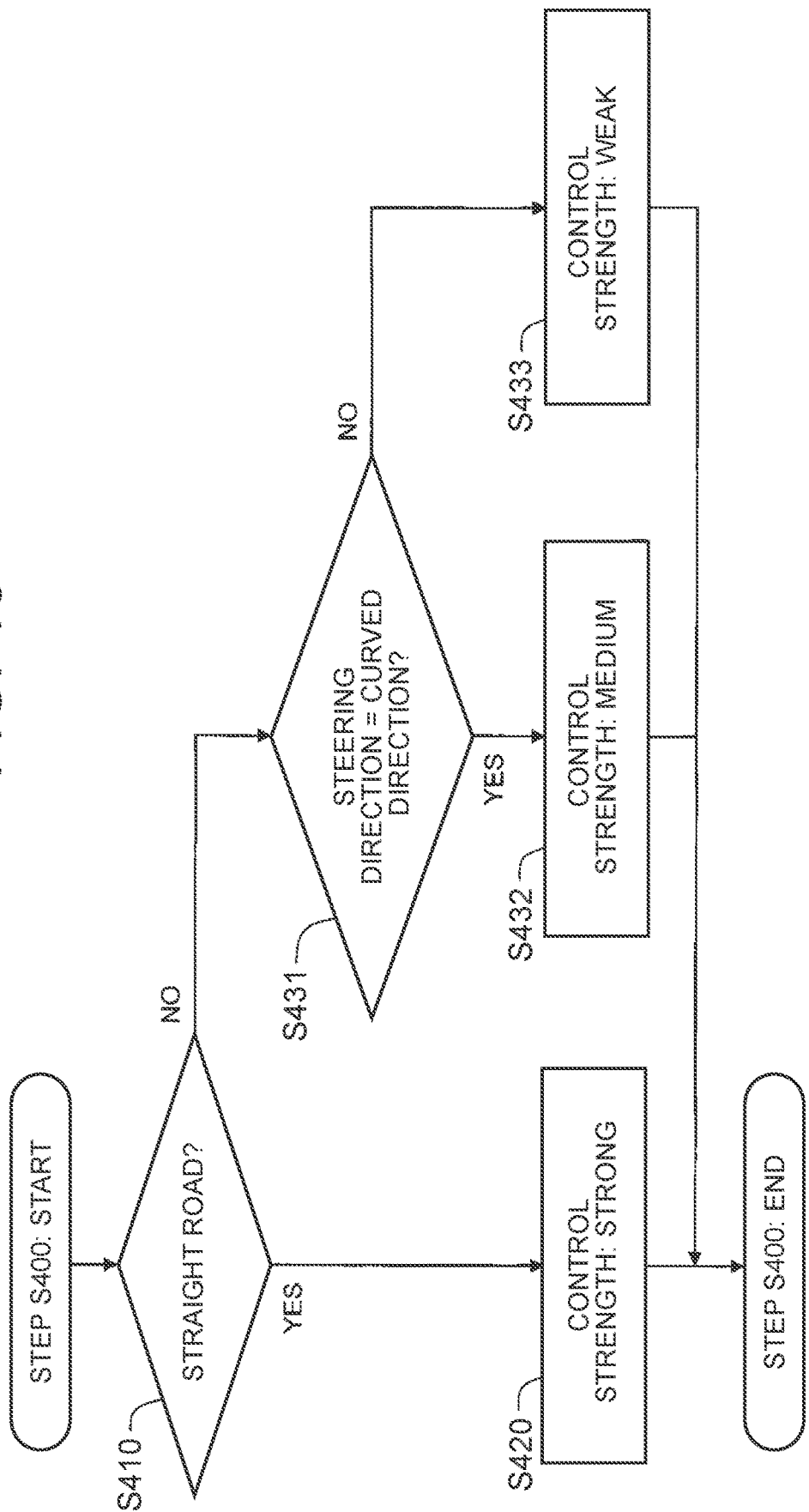
FIG. 18 is a flowchart illustrating a second example of adjusting the control strength of the steering support control according to the embodiment of the present disclosure.

FIG. 18 is a flowchart illustrating a second example of adjusting the control strength of the steering support control. Descriptions that overlap with the first example shown in FIG. 17 will be omitted as appropriate. Steps S410 and S420 are the same as in the first example. When the road ahead includes a curved road (step S410; No), the process proceeds to step S431.

In step S431, the processor 110 determines whether the steering direction (first direction) of the steering support control coincides with the curved direction of the curved road. This determination method is the same as step S331 (see FIG. 14) described above. When the steering direction coincides with the curved direction (step S431; Yes), the process proceeds to step S432. On the other hand, when the steering direction is opposite to the curved direction (step S431; No), the process proceeds to step S433.

In step S432, the processor 110 sets the control strength of the steering support control weaker than that in step S420.

In step S433, the processor 110 sets the control strength of the steering support control further weaker than that in step S432. That is, when the steering direction is opposite to the curved direction (see FIG. 5), the control strength of the steering support control is weaker than when the steering direction coincides with the curved direction (see FIG. 4).

Further specifically, when compared under the condition that the relative relationship parameters Pr are the same, the target steering amount $\theta t$ in step S433 is smaller than the target steering amount $\theta t$ in step S432. That is, the processor 110 sets the target steering amount $\theta t$ for the same relative relationship parameter Pr smaller in the case of step S433 than in the case of step S432.

For example, in step S420, the processor 110 calculates the first target steering amount $\theta t1$ using the first function f1 (see the following equation (3)). In step S432, the processor 110 calculates the second target steering amount θt2 using the second function f2. In step S433, the processor 110 calculates a third target steering amount θt3 using a third function f3. The first function f1 and the second function f2 are set so that the second target steering amount θt2 is smaller than the first target steering amount θt1 when compared under the condition that the relative relationship parameters Pr are the same. Similarly, the second function f2 and the third function f3 are set so that the third target steering amount θt3 is smaller than the second target steering amount θt2.

$$\theta t1 = f1(Pr)$$

$$\theta t2 = f2(Pr) < f1(Pr)$$

$$\theta t3 = f3(Pr) < f2(Pr) \quad \text{Equation (3):}$$

The information of each function f (f1, f2, f3) is included in the control adjustment information 400. The processor 110 refers to the control adjustment information 400 and selects the function f depending on the road shape of the road ahead and the steering direction to calculate the target steering amount θt using the selected function f. Thereby, the magnitude of the target steering amount θt, that is, the control strength of the steering support control can be variably set depending on the road shape of the road ahead and the steering direction.

4-3. Third Example

In the third example, the processor 110 further weakens the control strength of the steering support control as the curvature C of the road ahead increases.

More specifically, when compared under the condition that the relative relationship parameters Pr are the same, the target steering amount θt decreases as the curvature C increases. That is, the processor 110 sets the target steering amount θt for the same relative relationship parameter Pr smaller as the curvature C increases.

For example, as in the following equation (4), the target steering amount θt is represented by a function g of the relative relationship parameter Pr and the curvature C. The function g is set such that, when compared under the condition that the relative relationship parameters Pr are the same, the target steering amount θt decreases as the curvature C increases.

$$\theta t = g(Pr, C) \quad \text{Equation (4):}$$

Figure 19:
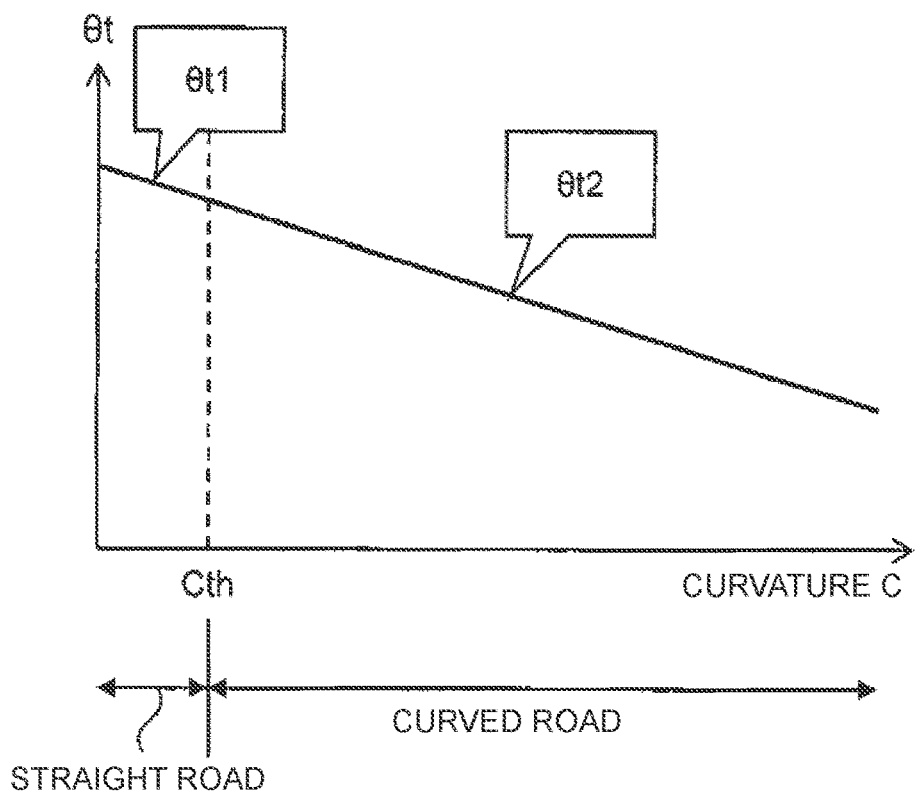
FIG. 19 is a conceptual diagram illustrating a third example of adjusting the control strength of the steering support control according to the embodiment of the present disclosure.

FIG. 19 is a graph showing an example of the function g. As the curvature C increases, the target steering amount θt decreases. As the curvature C increases, the target steering amount θt may decrease monotonically or stepwise.

Figure 20:
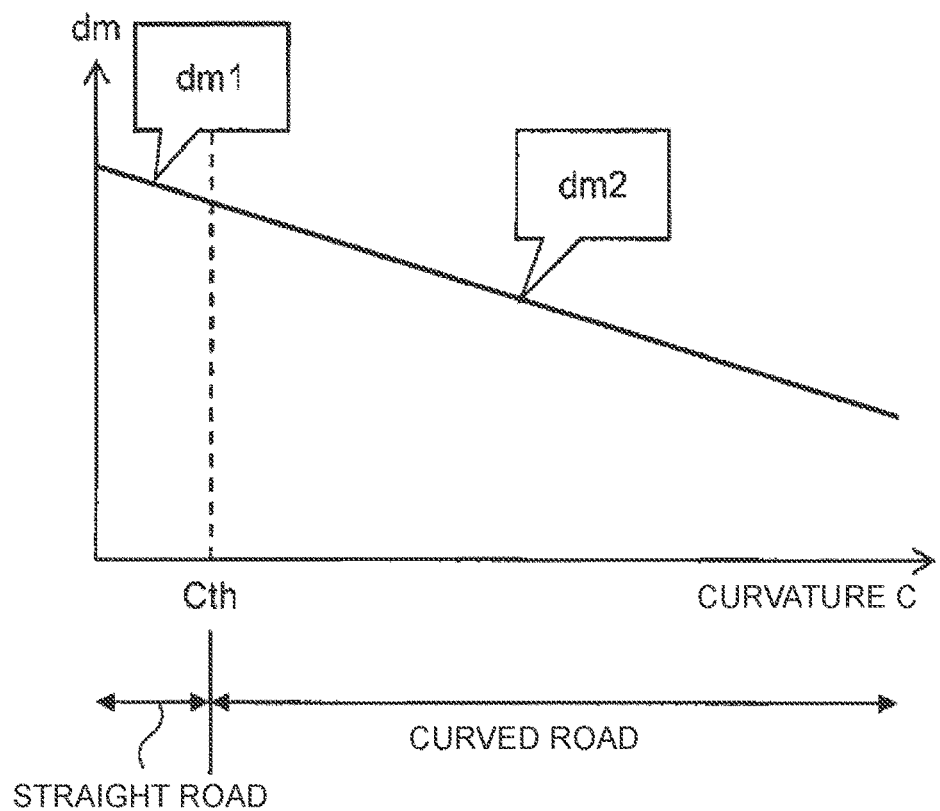
FIG. 20 is a conceptual diagram illustrating the third example of adjusting the control strength of the steering support control according to the embodiment of the present disclosure.

FIG. 20 is a graph showing another example of the function g. In the example shown in FIG. 20, the margin distance dm of the risk region RSK depends on the curvature C of the road ahead. More specifically, as the curvature C increases, the margin distance dm decreases. Thus, as the curvature C increases, the target steering amount θt decreases. As the curvature C increases, the margin distance dm may decrease monotonically or stepwise.

The information of the function g is included in the control adjustment information 400. The processor 110 calculates the target steering amount θt depending on the curvature C using the function g shown in the control adjustment information 400. Thereby, the magnitude of the target steering amount θt, that is, the control strength of the steering support control can be variably set depending on the curvature C of the road ahead.

The third example can be combined with either one of the first example and the second example described above.

5. Adjustment of Start Timing of Steering Support Control

Instead of adjusting the operating condition of the risk avoidance control in step S300, the start timing of the steering support control may be adjusted "directly" in step S400. Hereinafter, various examples of methods for adjusting the start timing of the steering support control will be described.

5-1. First Example

Figure 21:
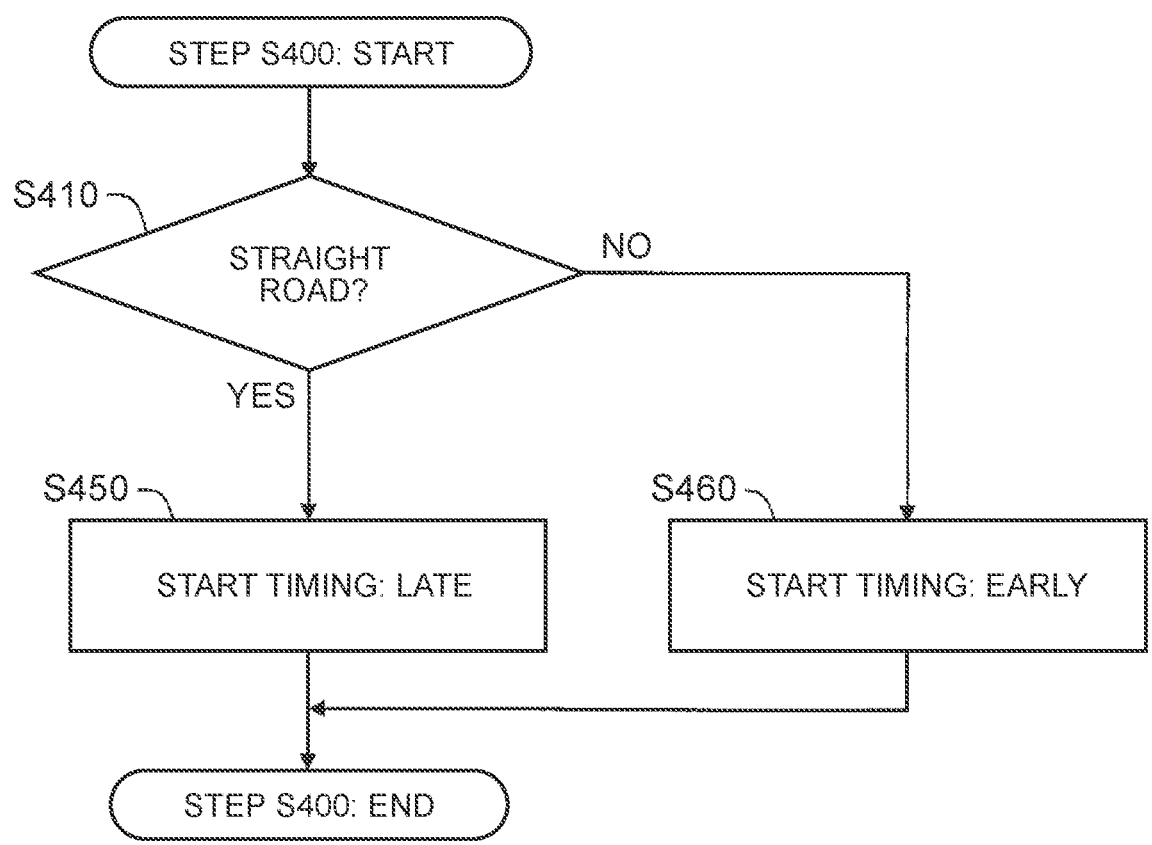
FIG. 21 is a flowchart illustrating a first example of adjusting a start timing of the steering support control according to the embodiment of the present disclosure.

FIG. 21 is a flowchart illustrating a first example of adjusting the start timing of the steering support control. FIG. 21 shows the details of step S400 described above.

In step S410, the processor 110 determines whether the road ahead from the vehicle 1 to the risk factor 3 is a straight road. This determination method is the same as step S310 (see FIG. 13) described above. When the road ahead is a straight road (step S410; Yes), the process proceeds to step S450. On the other hand, when the road ahead includes a curved road (step S410; No), the process proceeds to step S460.

In step S450, the processor 110 sets the start timing of the steering support control to a relatively later timing.

In step S460, the processor 110 sets the start timing of the steering support control to a timing earlier than that in step S450. That is, when the road ahead includes a curved road, the start timing of the steering support control is earlier than when the road ahead is a straight road (see FIGS. 6 and 7).

For example, the processor 110 sets the start timing of the steering support control to a timing delayed from the reference timing by a delay time td. In step S450, the processor 110 sets the delay time td to a first delay time td1. On the other hand, in step S460, the processor 110 sets the delay time td to a second delay time td2. The second delay time td2 is shorter than the first delay time td1 (td2<td1).

The information of the delay time td (td1, td2) is included in the control adjustment information 400. The processor 110 refers to the control adjustment information 400 and selects the delay time td depending on the road shape of the road ahead. This makes it possible to variably set the start timing of the steering support control depending on the road shape of the road ahead.

5-2. Second Example

Figure 22:
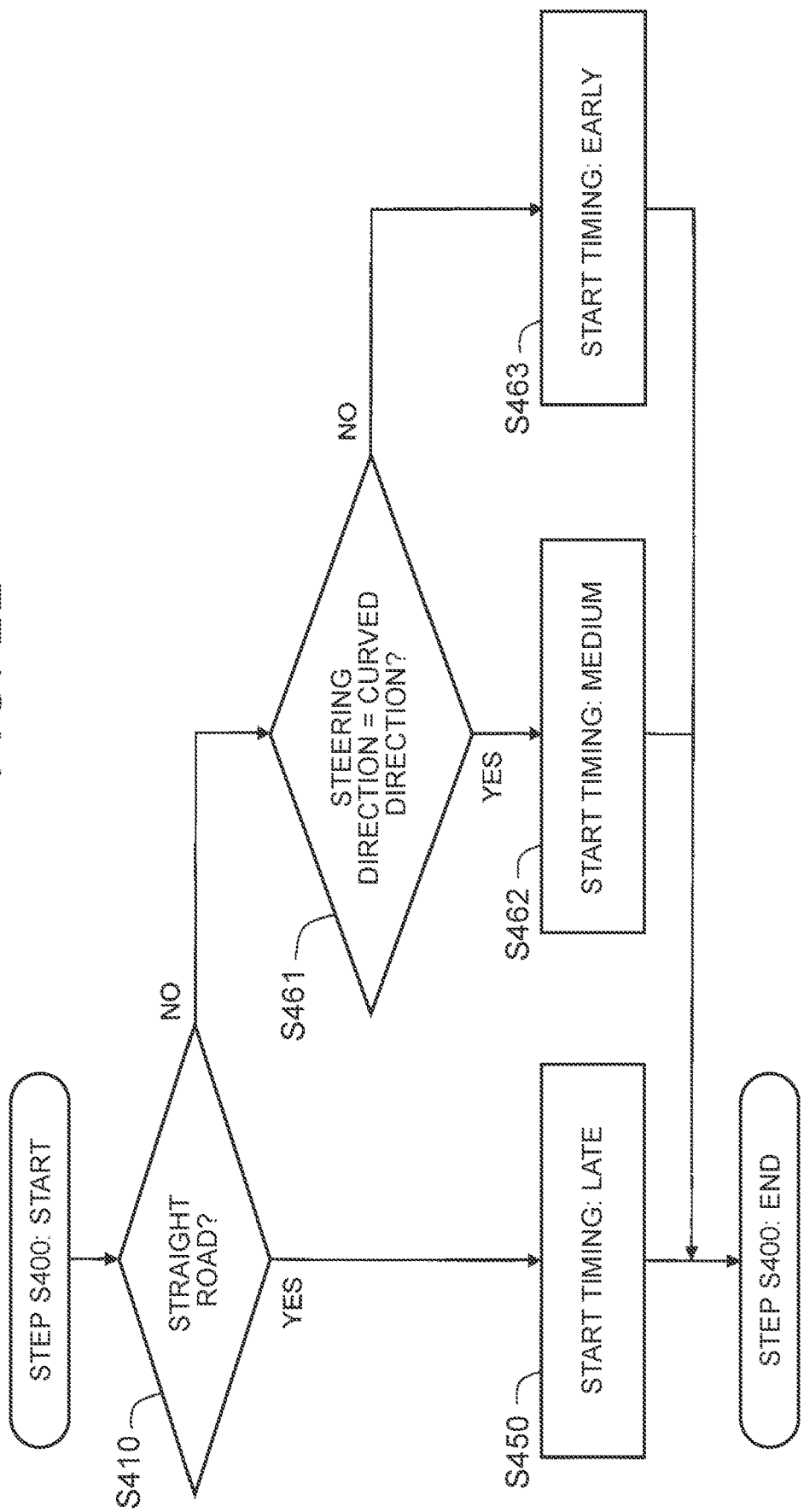
FIG. 22 is a flowchart illustrating a second example of adjusting the start timing of the steering support control according to the embodiment of the present disclosure.

FIG. 22 is a flowchart illustrating a second example of adjusting the start timing of the steering support control. Descriptions that overlap with the first example shown in FIG. 21 will be omitted as appropriate. Steps S410 and S450 are the same as in the first example. When the road ahead includes a curved road (step S410; No), the process proceeds to step S461.

In step S461, the processor 110 determines whether the steering direction (first direction) of the steering support control coincides with the curved direction of the curved road. This determination method is the same as step S331 (see FIG. 14) described above. When the steering direction coincides with the curved direction (step S461; Yes), the process proceeds to step S462. On the other hand, when the steering direction is opposite to the curved direction (step S461; No), the process proceeds to step S463.

In step S462, the processor 110 sets the start timing of the steering support control to a timing earlier than that in step S450. For example, the processor 110 sets the delay time td to the second delay time td2, which is shorter than the first delay time td1 (td2<td1).

In step S463, the processor 110 sets the start timing of the steering support control to a timing earlier than that in step S462. For example, the processor 110 sets the delay time td to a third delay time td3, which is further shorter than the second delay time td2 (td3<td2). Thus, when the steering direction is opposite to the curved direction (see FIG. 7), the start timing of the steering support control is earlier than when the steering direction coincides with the curved direction (see FIG. 6).

The information of the delay time td (td1, td2, td3) is included in the control adjustment information 400. The processor 110 refers to the control adjustment information 400 and selects the delay time td depending on the road shape of the road ahead and the steering direction. This makes it possible to variably set the start timing of the steering support control depending on the road shape of the road ahead and the steering direction.

5-3. Third Example

Figure 23:
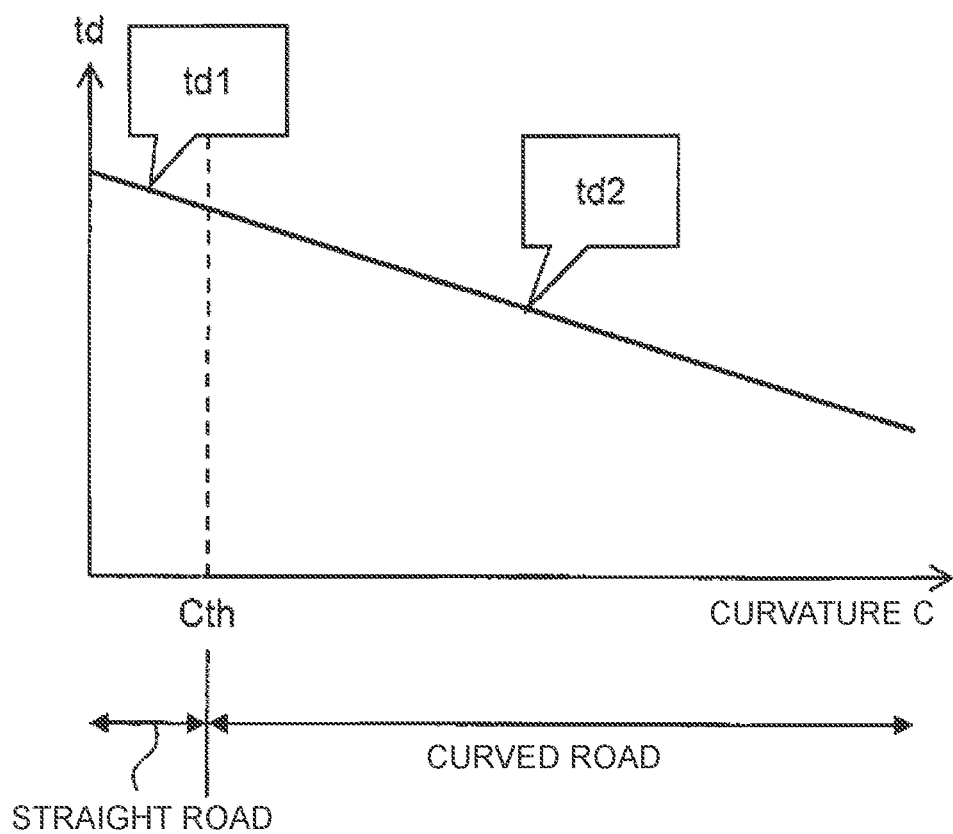
FIG. 23 is a conceptual diagram illustrating a third example of adjusting the start timing of the steering support control according to the embodiment of the present disclosure.

FIG. 23 is a flowchart illustrating a third example of adjusting the start timing of the steering support control. In the third example, the delay time td decreases as the curvature C of the road ahead increases. For example, as shown in FIG. 23, as the curvature C increases, the delay time td decreases monotonically. As another example, as the curvature C increases, the delay time td may decrease stepwise. Thus, as the curvature C increases, the start timing of the risk avoidance control (steering support control) becomes earlier.

The delay time td is represented by a function of the curvature C of the road ahead. The function may be a mathematical formula or a map generated in advance. The information of the function is included in the control adjustment information 400. The processor 110 uses the function shown in the control adjustment information 400 to set the delay time td depending on the curvature C of the road ahead. Thus, the processor 110 can advance the start timing of the steering support control as the curvature C increases.

The third example can be combined with either one of the first example and the second example described above.

What is claimed is:

1. A driving support system that supports driving of a vehicle, the driving support system comprising:
a storage device that stores driving environment information indicating a driving environment of the vehicle; and
a processor that executes steering support control for steering the vehicle in a first direction away from a risk factor in front of the vehicle based on the driving environment information, wherein:
a target steering amount in the steering support control is represented by a function of a relative relationship parameter including a lateral distance between the vehicle and the risk factor;
a straight road is a road having a curvature less than a first curvature;
a curved road is a road having a curvature equal to or greater than the first curvature;
when a road ahead from the vehicle to the risk factor includes the curved road, the processor reduces the target steering amount for the same relative relationship parameter or advances a start timing of the steering support control as compared to when the road ahead is the straight road;
the processor sets a start timing of the steering support control to a timing delayed from a reference timing by a delay time;
when the road ahead from the vehicle to the risk factor includes the curved road, the processor sets the delay time to a second delay time;
when the road ahead is the straight road, the processor sets the delay time to a first delay time; and
the second delay time is shorter than the first delay time.

2. The driving support system according to claim 1, wherein when the road ahead includes the curved road and the first direction is opposite to a curved direction of the curved road, the processor reduces the target steering amount for the same relative relationship parameter or advances the start timing of the steering support control as compared to when the first direction coincides with the curved direction.

3. The driving support system according to claim 1, wherein the processor reduces the target steering amount for the same relative relationship parameter or advances the start timing of the steering support control as the curvature of the curved road increases.

4. The driving support system according to claim 1, wherein:
the processor sets a risk region around the risk factor and executes the steering support control such that the vehicle avoids the risk region; and
the processor reduces the target steering amount for the same relative relationship parameter by reducing the risk region.

5. The driving support system according to claim 1, wherein the risk factor includes at least one of a pedestrian, a bicycle, a two-wheeled vehicle, and a parked vehicle in front of the vehicle.

* * * * *